United States Patent
Toyooka et al.

(10) Patent No.: US 7,458,793 B2
(45) Date of Patent: Dec. 2, 2008

(54) MOLD FOR IN-MOLD DECORATION

(75) Inventors: Naoto Toyooka, Kyoto (JP); Mitsuhiro Ozawa, Kyoto (JP)

(73) Assignee: Nissha Printing Co., Ltd., Kyoto (JP)

( * ) Notice: Subject to any disclaimer, the term of this patent is extended or adjusted under 35 U.S.C. 154(b) by 0 days.

(21) Appl. No.: 10/550,913

(22) PCT Filed: Mar. 31, 2004

(86) PCT No.: PCT/JP2004/004658

§ 371 (c)(1),
(2), (4) Date: Mar. 12, 2007

(87) PCT Pub. No.: WO2004/087395

PCT Pub. Date: Oct. 14, 2004

(65) Prior Publication Data

US 2007/0184148 A1    Aug. 9, 2007

(30) Foreign Application Priority Data

Mar. 31, 2003    (JP) .............................. 2003-092999

(51) Int. Cl.
*B29C 45/14*    (2006.01)
(52) U.S. Cl. ................. 425/112; 425/126.1; 425/129.1; 425/190; 425/192 R
(58) Field of Classification Search ................. 425/112, 425/129.1, 111, 190, 192 R, 195, 186, 552, 425/126.1
See application file for complete search history.

(56) References Cited

U.S. PATENT DOCUMENTS

| | | | | |
|---|---|---|---|---|
| 3,717,428 A | * | 2/1973 | Andras ........................ | 425/191 |
| 5,516,470 A | * | 5/1996 | Larsson ........................ | 264/39 |
| 5,753,275 A | * | 5/1998 | Takahashi et al. ............ | 425/186 |
| 5,851,558 A | * | 12/1998 | Atake .......................... | 425/111 |
| 6,254,812 B1 | | 7/2001 | Goodridge et al. | |

FOREIGN PATENT DOCUMENTS

| | | |
|---|---|---|
| EP | 0 999 024 | 5/2000 |
| JP | 2-187245 | 7/1990 |
| JP | 2-269020 | 11/1990 |
| JP | 5-86437 | 11/1993 |
| JP | 10-278047 | 10/1998 |
| JP | 2001-001376 | 1/2001 |
| WO | 00/30827 | 6/2000 |

\* cited by examiner

*Primary Examiner*—Robert B Davis
(74) *Attorney, Agent, or Firm*—Wenderoth, Lind & Ponack, L.L.P.

(57) ABSTRACT

A mold for in-mold decorating that includes a stationary mold member and a movable mold member through which a decorating film can be passed. At least one of the mold members includes a cavity-forming block with molding cavity configured to receive a design pattern of the decorating film, a dieset, and engaging portions for mounting the cavity-forming block on the dieset. Clamping-force receiving portions are located around the cavity-forming block such that a clamping force is not applied to the decorating film when the mold members are joined.

19 Claims, 30 Drawing Sheets

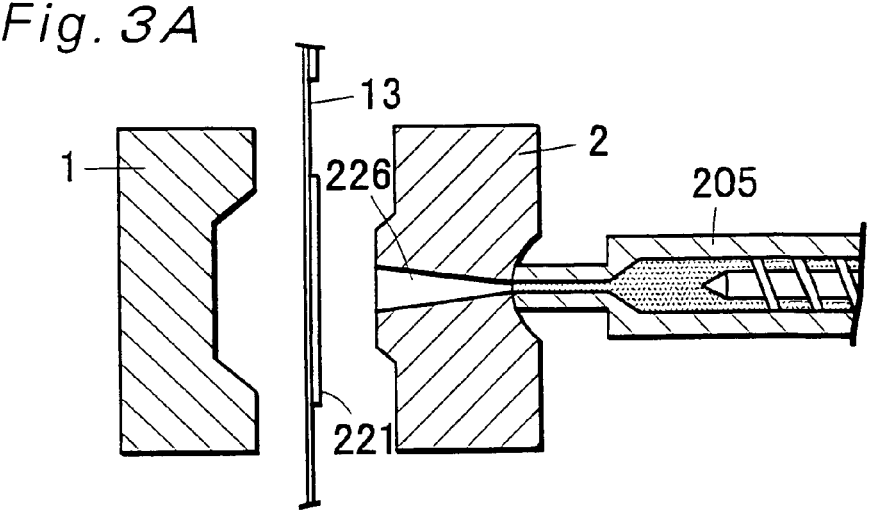
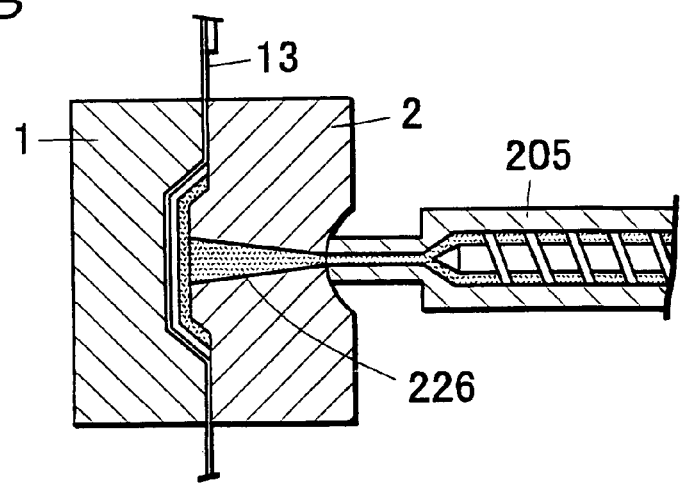
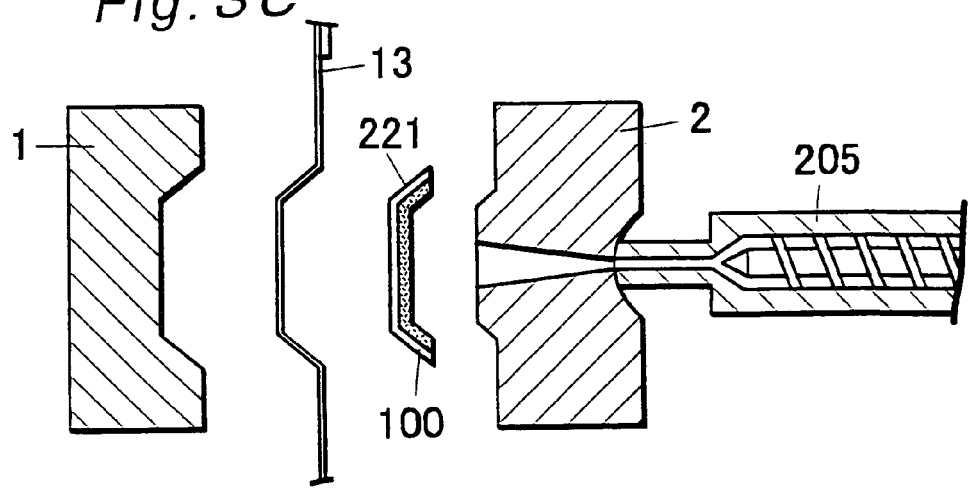

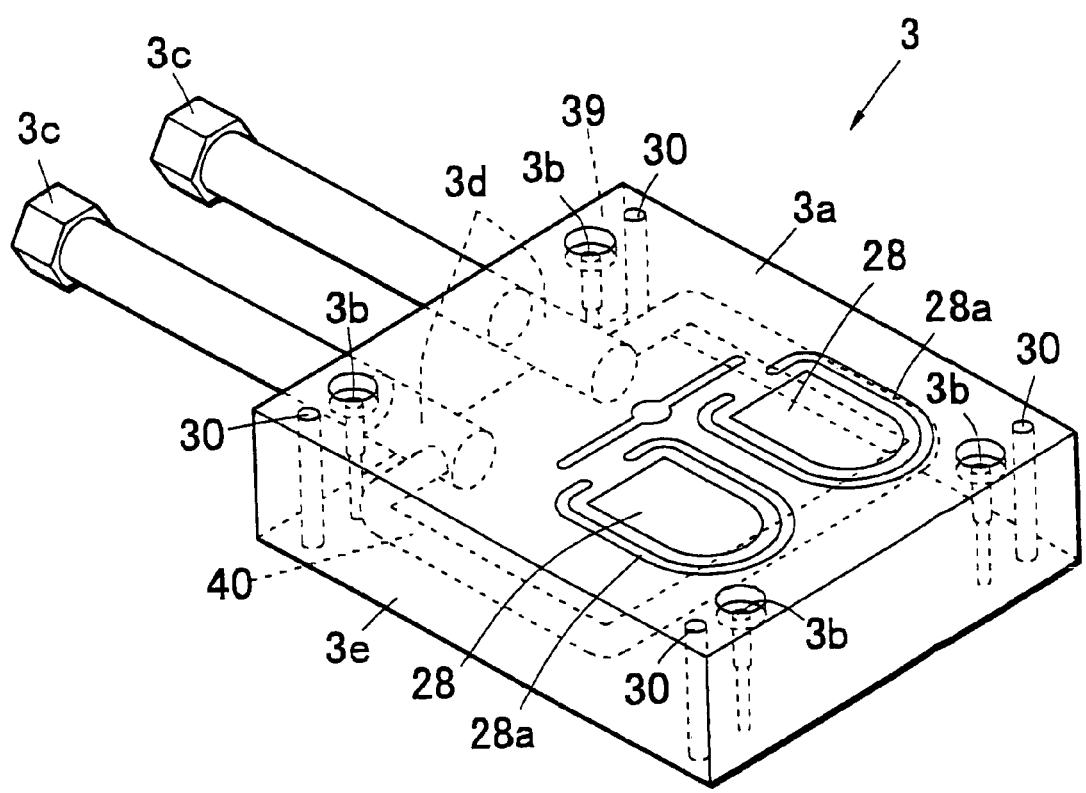

MOLD FOR IN-MOLD DECORATION

BACKGROUND OF THE INVENTION

1. Field of Invention

The present invention relates to a mold for in-mold decoration which allows a low price and a short delivery period to be realized in mold manufacture, and which is excellent in thermal efficiency in its molding process.

2. Description of the Related Art

Conventionally, as a method for decorating a surface of a molded article made of resin, there has been an in-mold decoration method including the steps of continuously feeding a printed or otherwise worked decorating film into a mold, and integrating the printed layer with the molded article surface by resin pressure and heat in the molding process. The mold for in-mold decoration is a so-called mold base, which is a standardized item for mold-parts supply manufacturers. The mold base is used according to standard types for general molding-use metal molds, where a molding-use cavity is formed on mold release surfaces (parting surfaces) of the mold base. More specifically, the cavity is formed, in many cases, in such a manner that opposed surfaces of a movable-side mount 57 and a stationary-side mount 60 are recess-machined, which is a machining to provide so-called pockets 62 (see, e.g., Japanese unexamined patent publication No. 2001-1376; see FIGS. 1 and 2 thereof), respectively. Nests 53, 54 are fitted into the pockets 62 so that a parting surface is formed by these nests 53, 54 and surrounding walls of the pockets (see FIGS. 24A, 24B).

In conventional molds 51, 52 for in-mold decoration, the pockets 62, into which the nests 53, 54 are to be loaded, are recessed so that bottom portions of the pockets provided on the side mounts 57, 60 are difficult to machine with high precision, making it quite hard to parallelize opposed surfaces of the movable-side nest 53 and the stationary-side nest 54 to each other when they are loaded to the pockets 62. If the opposed surfaces of the nests 53, 54 cannot be parallelized to each other sufficiently, resin fins occur in resulting molded articles, or discharge failure of air and gas attributed to a decorating film being interposed in the molds would cause products to suffer such problems as film wrinkles and ink blots. Further the nests 53, 54 would collide upon mold clamping and become damaged.

To prevent such problems, it would be necessary to take sufficient time to machine the pockets 62 with high precision, but this would make it impossible to meet short delivery periods required in mold manufacture. Also, taking more time to do the pocket machining would cause the manufacturing cost of the molds to increase proportionally.

Moreover, the minimum dimensions required for the nests 53, 54 must be changed depending on changes in the number or size of the molded articles to be molded at a time. However, in the conventional mold for in-mold decoration, the nests 53, 54 and the pockets 62 have to be formed so as to be congruous with each other. Therefore, each time the dimensions of the nests 53, 54 are changed, it is necessary to prepare mold constituent members (mounts) having pockets suited to the nests 53, 54 of new dimensions. Indeed, a larger and fixed dimensioned pocket for the mold base would make it possible to use mold constituent members other than the nests 53, 54. In this case, the nests 53, 54 would have to be dimensioned in suitability to the size of a relatively larger pocket 62, where unnecessary parts would be included, involving wasteful material use for the nests 53, 54. Also, since the decorating film 13 would have to be dimensioned in suitability to the size of the nests including the unnecessary parts, a pattern pitch of design patterns provided on the decorating film in the film feed direction and in an across-the-width dimension of the decorating film would need to be increased, resulting in increase in wasteful use of the decorating film.

Also, since the nests 53, 54 are fitted within the pockets 62, there occurs heat conduction from the side faces of the nests 53, 54 to surrounding walls 56, 66 of the pockets on the movable-side mount 57 and the stationary-side mount 60, resulting in poor thermal efficiency of the molds 51, 52. As a result, a longer molding cycle is required. Further, since temperature control for the molds 51, 52 becomes difficult, there are considerable influences exerted on the fluidization, solidification, shrinkage, crystallization, and the like of the molten resin material. The influences extend to various aspects of performance of the molded article such as the strength, surface property, shrinkage amount, warpage, torsion, or other deformations of the molded article.

Further, although it is important in the molding process to replace the air in the cavity, the sprue, and the runner with resin material in short time and to discharge the gas that has been brought in by the resin material, the nests 53, 54 are fitted into the pockets 62 so that the surrounding walls 56, 66 constituting the pockets hinder smooth discharge during the air ventilating and gas ventilating. As a result, there would occur gas burns or wrinkles on the decorated molded article, which might cause occurrence of close contact failure between the decorating film 13 and the molded article.

Further, since the surrounding walls 56, 66 of the pockets and the nests constitute parting faces which come into contact with each other in the state that two molds are closed, a mold clamping force is applied to the decorating film interposed in between both the molds, thereby damaging the decorating film. Further, in the case where the bottom surfaces of the pockets are not machined with high precision, appropriate positioning of the nests is hard to achieve and, therefore, corner portions of the surfaces of the nests may be brought into contact with the decorating film, causing the decorating film to break.

Therefore, an object of the present invention is to provide a mold for in-mold decoration which solves the above-described issues, allows a low price and a short delivery period to be realized in mold manufacture, and contributes to stable mass production in its molding process.

BRIEF SUMMARY OF THE INVENTION

According to the first aspect of the present invention, there is provided a mold for in-mold decoration, comprising: a stationary-side mold and a movable-side mold, at least one of the molds having a cavity-forming block including a molding-use cavity and a dieset for mounting the cavity-forming block, such that a decorating film can be disposed in between both the molds in a state that a design pattern of the decorating film is positioned at the cavity, and molten resin can be injected to the cavity so as to mold a molded article.

The dieset for mounting the cavity-forming block comprises: a mounting face which is positioned on a face opposed to the other mold so as to overlap with a passing region of the decorating film, and which is formed smoothly; and a mold clamping force-receiving portion provided outside the passing region of the decorating film and the mounting face in a way almost symmetrical with respect to a center line of the one mold along a passing direction of the decorating film, and.

Further, either the dieset, or the cavity-forming block has an engagement protruding portion, and the other has an engagement recess portion which engages with the engagement protruding portion. The engagement protruding portion is engaged with the engagement recess portion so that the cavity-forming block is positioned at the mounting face of the dieset and the cavity-forming block is mounted on the dieset.

According to the second aspect of the present invention, there is provided the mold for in-mold decoration of the first aspect, wherein either the engagement protruding portion or the engagement recess portion is provided on the mounting face, while the other is provided on a back face of the cavity defining side face of the cavity-forming block. The recess portion is formed into a long hole which is long in radiating direction from an injection port provided on the dieset for injecting the molten resin into the cavity, or from a position or a corresponding position at which a sprue of the cavity-forming block for feeding the molten resin from the injection port to the cavity is provided. A longitudinal inner wall of the engagement recess portion is structured to be in contact with the engagement protruding portion when the cavity-forming block is mounted on the mount.

According to the third aspect of the present invention, there is provided the mold for in-mold decoration of the second aspect, wherein the engagement protruding portion is provided on the mounting face, while the recess portion is provided on the back face side.

According to the fourth aspect of the present invention, there is provided the mold for in-mold decoration of the first aspect, further comprising a clearance inside the passing region of the decorating film for interposing the decorating film therein in a state that both the molds are closed.

According to the fifth aspect of the present invention, there is provided the mold for in-mold decoration of the fourth aspect, wherein the clearance is formed by setting a surface of the cavity defining side on the cavity-forming block of the one mold to be lower than an opposed face of the clamping force-receiving portions opposed to the other mold when viewed from the mounting face.

According to the sixth aspect of the present invention, there is provided the mold for in-mold decoration of the fourth or fifth aspect, wherein the clearance is dimensioned so that clamping force of both the molds is not exerted on the decoration film.

According to the seventh aspect of the present invention, there is provided the mold for in-mold decoration of the fourth or fifth aspect, wherein the clearance is dimensioned to be almost identical to a thickness of the decoration film.

According to the eighth aspect of the present invention, there is provided the mold for in-mold decoration of the first aspect, wherein the mounting face is provided on a face of the dieset opposed to the other mold, and is also provided on a plane identical to a smoothing face smoothed together with the mounting face.

According to the ninth aspect of the present invention, there is provided the mold for in-mold decoration of the first aspect, wherein the clamping force-receiving portion is formed integrally with the dieset.

According to the tenth aspect of the present invention, there is provided the mold for in-mold decoration of the first aspect, further comprising a clamp in the movable-side mold for retaining the decorating film in a state that a design pattern of the decorating film is positioned inside the cavity, the clamp being supported by the cavity-forming block.

According to the eleventh aspect of the present invention, there is provided the mold for in-mold decoration of the first aspect, further comprising a clamp in the movable-side mold for retaining the decorating film in a state that a design pattern of the decorating film is positioned inside the cavity, the clamp being supported by the clamping force-receiving portion.

According to the twelfth aspect of the present invention, there is provided the mold for in-mold decoration of the first aspect, wherein the cavity-forming block has a coolant pipeline for cooling the molten resin injected into the cavity, the coolant pipeline being directly connected to a coolant feeder.

According to the thirteenth aspect of the present invention, there is provided the mold for in-mold decoration of the first aspect, wherein the clamping force-receiving portion is provided away from the cavity-forming block.

According to the present invention, instead of attaching the pockets into which the cavity-forming blocks are fitted to the dieset, the dieset and the cavity-forming block are positioned and joined by the engagement protruding portion provided at either one of the dieset and the cavity-forming block and the engagement recess portion provided on the other. Further, a plurality of clamping force-receiving portions are disposed partly around the cavity-forming block instead of forming a frame shape, so that a clearance where the force-receiving portions are not provided can be used to smooth the mounting face, which eliminates the necessity of recessing, and facilitates smoothing of the mounting face. This makes it possible to shorten time necessary for mold manufacturing, thereby allowing low price and short delivery period to be realized, while contributing to a stable mass-production in molding process. Moreover, if the mounting face is structured to be on the same plane as the smoothing face, the smoothing face makes the edges of the face subject to smoothing open, which allows the mounting face and the smoothing face to be collectively processed, and thereby allows smoothing to be further facilitated.

Moreover, since the cavity-forming block is provided on the passing region of the decorating film, and the clamping force-receiving portions are provided outside the passing region of the decorating film and the mounting face, the clamping force will not be exerted on the decorating film when both the molds are closed. This prevents the film from being damaged during in-mold decoration process. Further, the cavity-forming block is mounted on the dieset not by the pocket, but by the engagement protruding portions and the engagement recess portions, which makes it possible to smooth the mounting face of the dieset and dispose the cavity-forming blocks in parallel with each other. Therefore, such problem as occurrence of fins in resulting molded articles can be prevented, and gases present in the cavity and the like can be discharged smoothly.

Further, the clamping force-receiving portions are present outside of the cavity-forming block and it is not necessary to form them into a frame shape, or more preferably, a clearance is provided between the clamping force-receiving portions and the cavity-forming block, so that contact portions between the clamping force-receiving portions and the cavity-forming block can be decreased, making it possible to reduce the amount of heat conducted from the cavity-forming block to other members. This facilitates temperature control, including temperature control of the molds.

BRIEF DESCRIPTION OF DRAWINGS

These and other aspects and features of the present invention will become clear from the following description taken in conjunction with the preferred embodiments thereof with reference to the accompanying drawings, in which:

FIGS. 3A, 3B and 3C are schematic views each showing the steps of in-mold decoration in the in-mold decorating apparatus of FIG. 1;

FIG. 8A is a perspective view showing a cavity-forming block for use in the movable-side mold in the mold for in-mold decoration of FIG. 5 viewed from a cavity-forming side face;

DETAILED DESCRIPTION OF THE INVENTION

Figure 1:
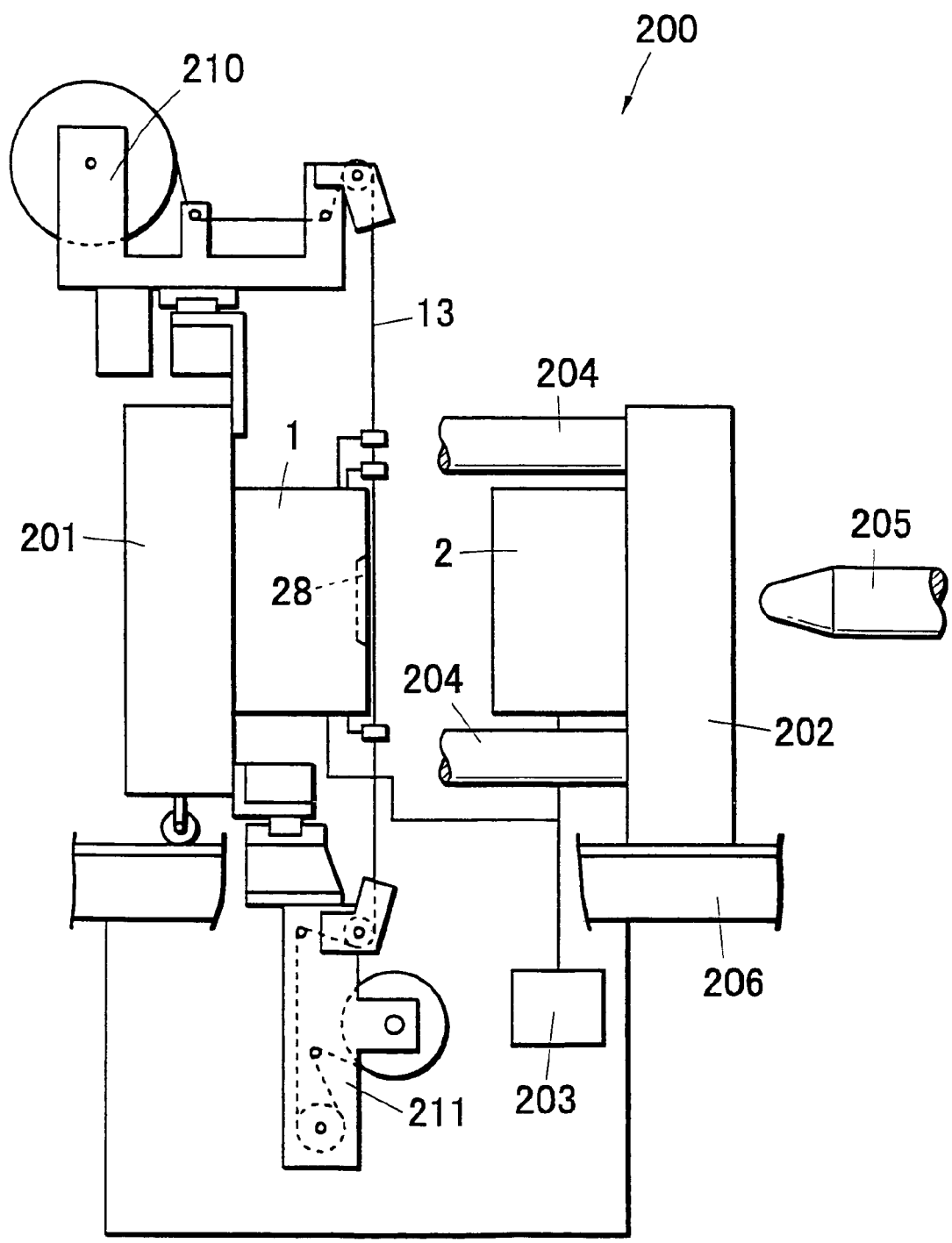
FIG. 1 is a view showing the outlined configuration of an in-mold decorating apparatus on which a mold for in-mold decoration according to a first embodiment of the present invention is mounted.

Before the description of the present invention proceeds, it is to be noted that like parts are designated by like reference numerals throughout the accompanying drawings.

Hereinbelow, embodiments of the present invention are described in detail with reference to the accompanying drawings.

FIRST EMBODIMENT

FIG. 1 is a view showing the outlined configuration of an in-mold decorating apparatus on which a mold for in-mold decoration according to a first embodiment of the present invention is mounted. As shown in FIG. 1, an in-mold decorating apparatus 200 is composed of a movable-side mold 1 mounted on a movable plate 201, a stationary-side mold 2 mounted on a stationary plate 202, and an injection nozzle 205 for injecting molten resin to a cavity formed between both the molds.

In the present embodiment, the stationary plate 202 is fixed to a frame 206, and a tie bar 204 fixed to the stationary plate 202 guides the movable plate 201, which moves so as to come into contact with, or go away from the stationary plate 202.

By moving the movable plate 201, the parting face of the stationary-side mold 2 and the parting face of the movable-side mold 1 are brought into tight contact with each other, which forms a closed mold state in which molding portions of the molds (a cavity 58 of the stationary-side mold 2 and a cavity 28 of the movable-side mold 1) constitute a cavity, and an open mold state in which the parting faces of both the molds are away from each other.

Further, while two molds, the stationary-side mold 2 and the movable-side mold 1, are used to form a cavity, it is also possible to use, for example, a subsidiary member such as an intermediate mold interposed in between both the molds for forming a cavity.

The movable plate 201 is equipped with a film feeder 210 and a film winder 211. The film feeder 210 and the film winder 211 move a decorating film 13 to the molding portion 28 of the movable-side mold 1 (to the longitudinal direction of the decorating film 13).

The decorating film 13 is moved in the state away from and also parallel to the parting face of the movable-side mold 1.

It is to be noted that the mounted position of the film feeder 210 and the film winder 211 is not limited to that shown in FIG. 1, but the film feeder 210 may be mounted on a lower portion or a lateral portion of the movable plate 201, while the film winder 211 may be mounted on an upper portion or a lateral portion of the movable plate 201; or the film feeder 210 and the film winder 211 may be mounted on the frame 206 and the stationary plate 202.

More particularly, any configuration is acceptable as long as the decorating film 13 can move in the longitudinal direction of the parting face of the mold (the parting face of the stationary-side mold 2 or the parting face of the movable-side mold 1) before in-mold decoration is applied.

Figure 2A:
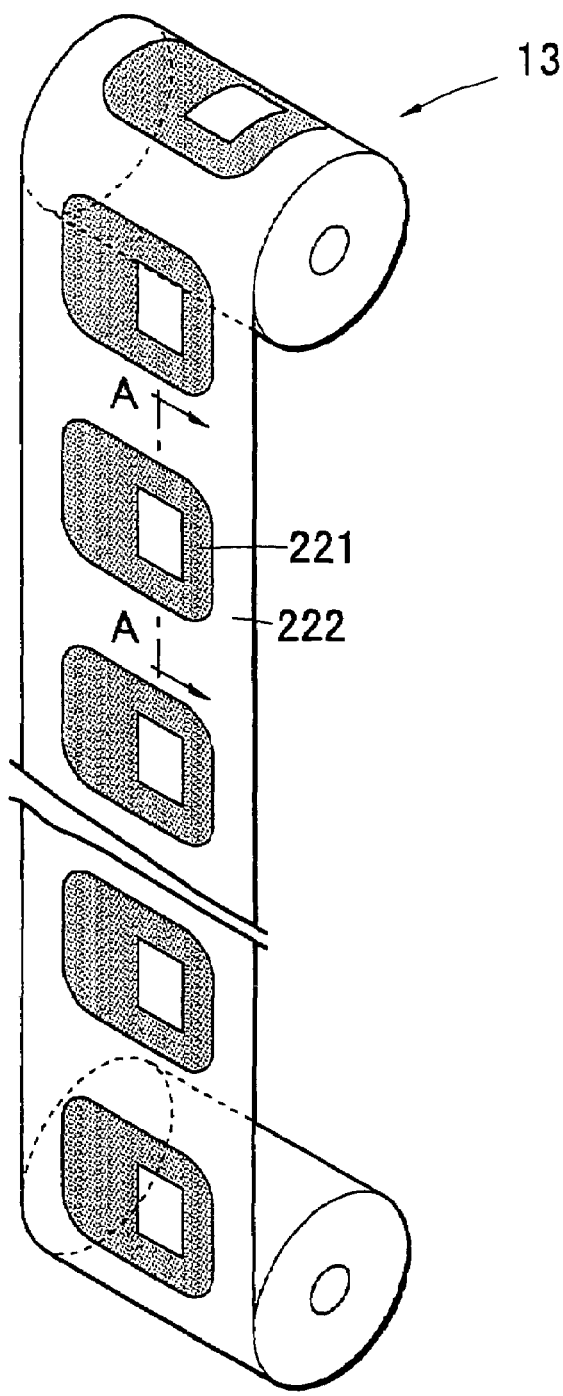
FIG. 2A is a view showing the external configuration of a decorating film for use in the in-mold decorating apparatus of FIG. 1.

Description is now given of the decorating film. The decorating film for use in the in-mold decorating apparatus in a roll state wound by the film feeder 210 is, as shown in FIG. 2A, fed so as to move on the parting face of the mold, and after in-mold decoration is performed, the decorating film is wound into a roll state by the film winder 211.

Figure 2B:
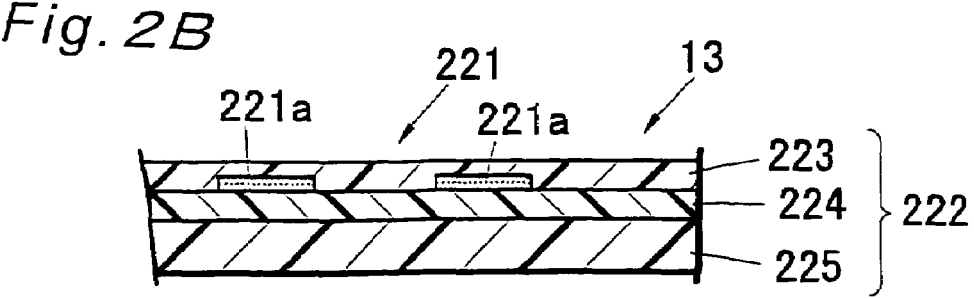
FIG. 2B is a schematic cross-sectional view taken along line A-A of FIG. 2A.

The decorating film 13, as shown in FIG. 2B, has design patterns 221 formed at intervals in longitudinal direction on the surface of a base material sheet 222. The base material sheet 222 has a base film 225 and a removal protection layer 224, on top of which design pattern ink layers 221a constituting the design patterns 221 are provided. Further, on the design pattern ink layers 221a, an adhesive layer 223 is provided. During the in-mold decorating process, the adhesive layer 223 comes into contact with molten resin to adhere to it, and the design pattern ink layers 221a are removed together with the removal protection layer 224 from the base film 225 and transferred to molded articles.

More particularly, during the in-mold transfer process, there is used a transfer material including a transfer layer made up of a removal protection layer 224, design pattern ink layers 221a and an adhesive layer 223 formed on a base film 225. The transfer material is interposed in between the molding-use metal molds, and the cavity is filled with injected resin and cooled to produce a resin molded article. At the same time, the transfer material is bonded to the face of the resin molded article, and then the base film is removed, and the transfer layer is transferred to the face of a transfer object so as to achieve decoration.

Materials of the base film 225 may include those used as base films of general transfer materials such as: resin sheets made of polypropylene resin, polyethylene resin, polyamide resin, polyester resin, polyacrylic resin, or polyvinyl chloride resin; metal foils including embossed foils and copper foils; glassine; coated paper; cellulosic sheets such as cellophane; and complexes composed of two or more of these sheets.

If removability of the transfer layers 221a, 223, and 224 from the base film 225 is good, then the transfer layers 221a, 223, and 224 may be provided directly on the base film 225. In order to improve the removability of the transfer layers from the base film 225, a parting layer may be formed entirely before the transfer layers are provided on the base film. When the base film 225 is removed after the in-mold transfer process, the parting layer is removed together with the base film 225 from the transfer layers. However, in some cases, interlayer parting may occur and part of the parting layer may remain on the outermost surface of the transfer layers. Materials of the parting layer may include melamine resin parting agents, silicon resin parting agents, fluorocarbon resin parting agents, cellulosic parting agents, urea resin parting agents, polyolefin resin parting agents, paraffinic parting agents and complex parting agents of these. The method for forming the parting layer includes: a coating method such as roll coating and spray coating; and a printing method such as gravure printing and screen printing.

Figure 4:
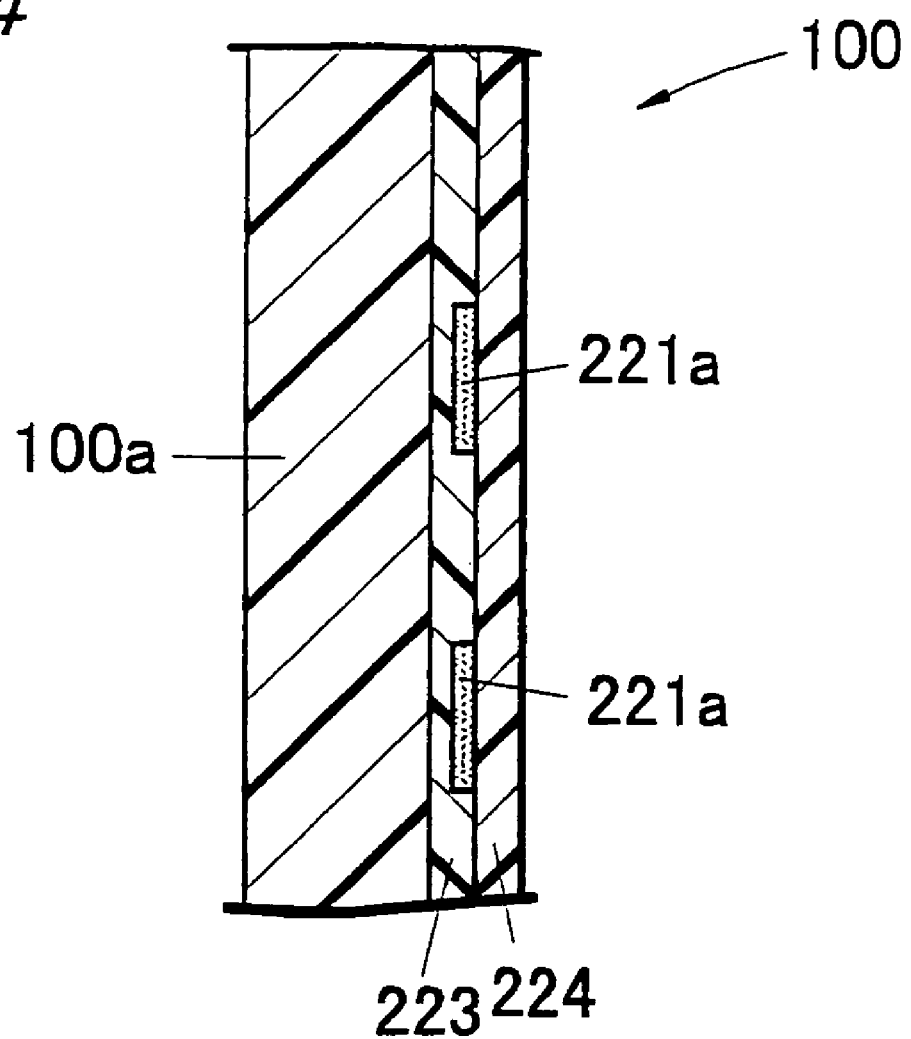
FIG. 4 is a view showing the cross-sectional configuration of a molded article molded by in-mold decoration steps in FIGS. 3A, 3B and 3C.

The removal protection layer 224 is formed entirely or partly on the base film 225 or the parting layer. As shown in FIG. 4, when the base film 225 is removed after the in-mold transfer process, the removal protection layer 224 is removed from the base film 225 or the parting layer to form an outermost surface of the transfer object.

It is to be noted that in the case where interlayer removal occurs in the removal protection layer 224, the parting layer remaining on the surface of the transfer layers constitutes the outermost surface of the transfer object. Materials of the removal protection layer 224 may include polyacrylic resin, polyester resin, polyvinyl chloride resin, cellulosic resin, rubber resin, polyurethane resin, polyvinyl acetate resin, and copolymer such as vinyl chloride-vinyl acetate copolymer resin and ethylene-vinyl acetate copolymer resin. When the removal protection layer 224 is required to have hardness, there may be selected and used: photo curing resin such as ultraviolet curing resin; radiation curable resin such as electron beam curable resin; and thermosetting resin.

The removal protection layer 224 may be colored or uncolored. The method for forming the removal protection layer 224 includes: a coating method such as gravure coating, roll coating and comma coating; and a printing method such as gravure printing and screen printing.

The design pattern ink layers 221a are normally formed as a printing layer on the removal protection layer 224. Materials of the printing layer may be formed from color ink containing appropriate-colored pigment or dye as coloring agents with use of resin as a binder, the resin including polyvinyl chloride resin, polyamide resin, polyester resin, polyacrylic resin, polyurethane resin, polyvinyl acetal resin, polyester polyurethane resin, cellulose ester resin and alkyd resin. The method for forming the printing layer may include normal printing methods such as offset printing, gravure printing, and screen printing. Particularly, in the case of conducting multiple color printing and half-toning, the offset printing and gravure printing are suitable. Moreover, in the case of monochromatic printing, the coating method such as gravure coating, roll coating, and comma coating my be adopted. The printing layer may be provided entirely or partly depending on the design patterns desired to be expressed.

Moreover, the design pattern ink layers 221a may be formed from metal thin films or a combination of the printing layer and the metal thin layer. The metal thin layer, which is for expressing metallic luster as the design pattern ink layers 221a, is formed by a vacuum evaporation method, a spattering method, an ion plating method, a plating method, and the like. In this case, depending on the metallic luster color desired to be expressed, there are used: metal such as aluminum, nickel, gold, white gold, chrome, iron, copper, tin, indium, silver, titanium, lead, and zinc; alloys thereof; or compounds thereof. As an example of the case for forming the partial metal thin film, there is a method composed of the steps of forming a solvent soluble resin layer in a portion where the metal thin film is not needed, forming a metal thin film on the entire resin layer, and cleaning the solvent so as to remove an unnecessary metal thin film together with the solvent soluble resin layer. The solvent often used in this case is water or aqueous solution. Further, as another example, there is a method composed of the steps of forming a metal thin film entirely, then forming a resist layer in a portion where the metal thin film is desired to remain, and removing the resist layer by etching with acid or alkaline. It is to be noted that when the metal thin film layer is formed, a front anchor layer and a rear anchor layer may be provided in order to improve the adhesiveness between other transfer layers and the metal thin film layer. Materials of the front anchor layer and the rear anchor layer to be used may include two-part curing polyurethane resin, thermosetting polyurethane resin, melamine resin, cellulose ester resin, chlorine-containing rubber resin, chlorine-containing vinyl resin, polyacrylic resin, epoxy resin, and vinyl copolymer resin. The method for forming the front anchor layer and the rear anchor layer includes: a coating method such as gravure coating, roll coating, and comma coating; and a printing method such as gravure printing and screen printing.

The adhesive layer 223 is for bonding each of the layers to the face of the transfer object. The adhesive layer 223 is formed on a bonding target portion. More particularly, if the bonding target portion is the entire face, then the adhesive layer 223 is formed entirely on the design pattern ink layers 221a. If the bonding target portion is a part of the face, then the adhesive layer 223 is formed partly on the design pattern ink layers 221a. As the adhesive layer 223, thermosensitive or pressure-sensitive resin suitable as a material of the transfer object is used accordingly. For example, in the case where the material of the transfer object is polyacrylic resin, polyacrylic resin should be used. In the case where the material of the transfer object is polyphenylene oxide copolymer-polystyrene copolymer resin, polycarbonate resin, styrene resin, or polystyrene blend resin, there should be used polyacrylic resin, polystyrene resin, polyamide resin or the like which are compatible with these resins should be used. Further, in the case where the material of the transfer object is polypropylene resin, such resin as chlorinated polyolefins resin, chlorinated ethylene-vinyl acetate copolymer resin, cyclized rubber, and coumarone-indene may be used. The method for forming the adhesive layer 223 includes: a coating method such as gravure coating, roll coating, and comma coating; and a printing method such as gravure printing and screen printing.

It is to be noted that the configuration of the transfer layers is not limited to the examples disclosed above and if, for example, the design pattern ink layer is made of a material with good adhesiveness to the transfer object, then the adhesive layer can be eliminated.

The transfer objects are made of resin molded articles. These objects may be transparent, translucent, or opaque. Further, the transfer objects may be colored or uncolored. The resin may include commodity resins such as polystyrene resin, polyolefin resin, ABS resin, AS resin, and AN resin. The resin may also includes: commodity engineering resins such as polyphenylene oxide polystyrene resin, polycarbonate resin, polyacetal resin, polyacrylic resin, polycarbonate degeneration polyphenylene ether resin, polyethylene terephthalate resin, polybutylene terephthalate and super high-molecular weight polyethylene resin; and super engineering resins such as polysulfone resin, polyphenylene sulfide, polyphenylene oxide resin, polyarylate resin, polyetherimide resin, polyimide resin, liquid-crystal polyester resin and polyallyl heat-resisting resin.

Description is given of the method for decorating the face of a resin molded article or a transfer object, by utilizing in-mold transfer method with injection molding with use of the above-stated decorating film. FIGS. 3A to 3C schematically show the resin processing steps for understanding of the steps of resin processing. First, as shown in FIG. 3A, a decorating film is sent to the inside of a molding-use metal mold made up of a movable-side mold and a stationary-side mold. In this case, the present embodiment is structured such that a necessary part of the long decorating film 13 is intermittently sent, though a sheet-type transfer material may be sent one by one. If a long decorating film 13 is used, a feeder having a positioning mechanism may be used so as to align design patterns 221 on the decorating film with the mold for in-mold decoration. Moreover, when the decorating film is intermittently sent, the decorating film is interposed in between the movable-side mold and the stationary-side mold and fixed therein after the position of the decorating film is detected by a sensor, which makes it possible to fix the transfer material always at the same position, bringing convenience as the design pattern ink layer is not dislocated. As shown in FIG. 3B, after the mold for in-mold decoration is closed, the cavity is filled with molten resin injected from a gate 226 provided on the stationary-side mold so as to form a transfer object while at the same time bonding the decorating film to the face of the transfer object. At this point, a coolant for cooling the cavity formed from both the molds is fed from a cooling water feed unit 203, shown in FIG. 1 to the cavity, as cooling the cavity allows the molten resin to be solidified in a short period of time, making it possible to reduce time necessary for the molding process.

Next, as shown in FIG. 3C, after a resin molded article 100 that is the transfer object is cooled, the mold for in-mold decoration is opened and the resin molded article 100 is extracted therefrom. Finally, the base film 225 is stripped off so that the design pattern ink layers 221a are transferred to the surface of an injected molding resin 100a, by which in-mold decoration is completed.

Figure 5:
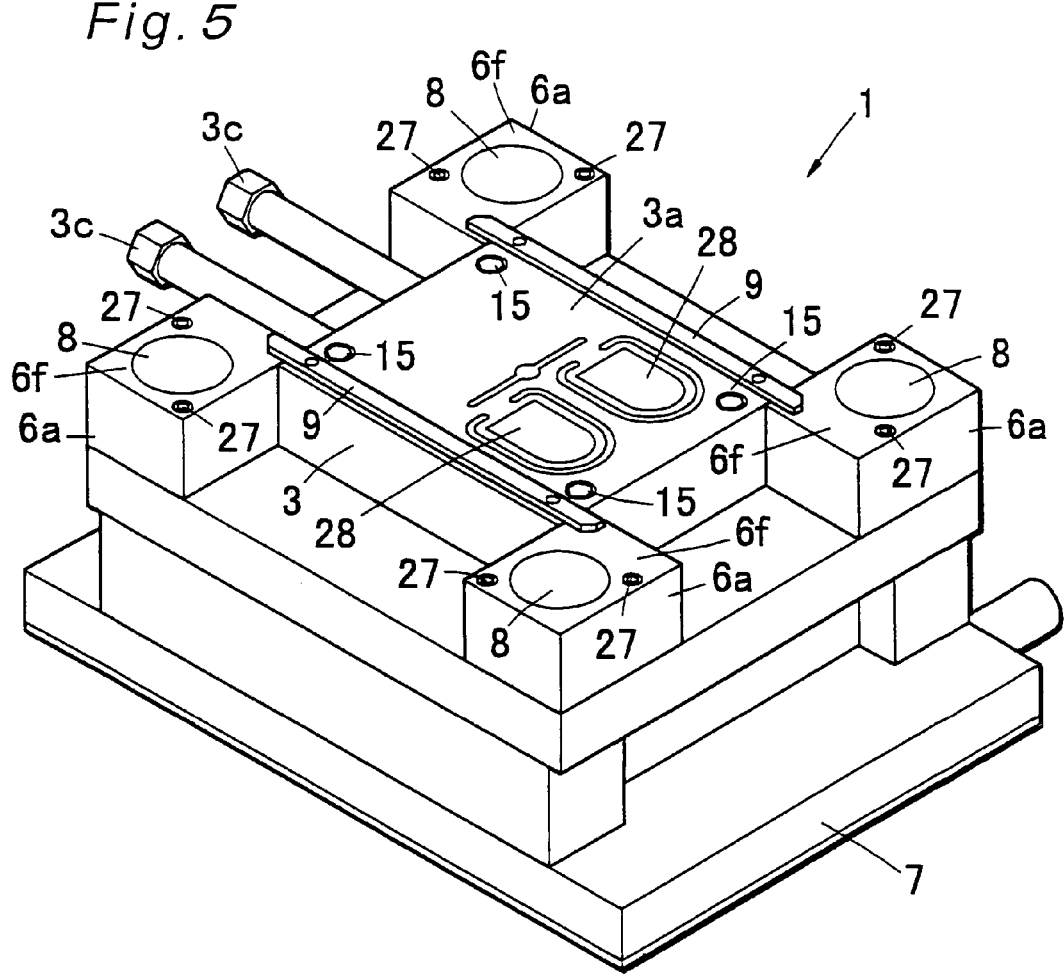
FIG. 5 is a perspective view showing the configuration of a movable-side mold in the mold for in-mold decoration in the first embodiment of the present invention.
Figure 14:
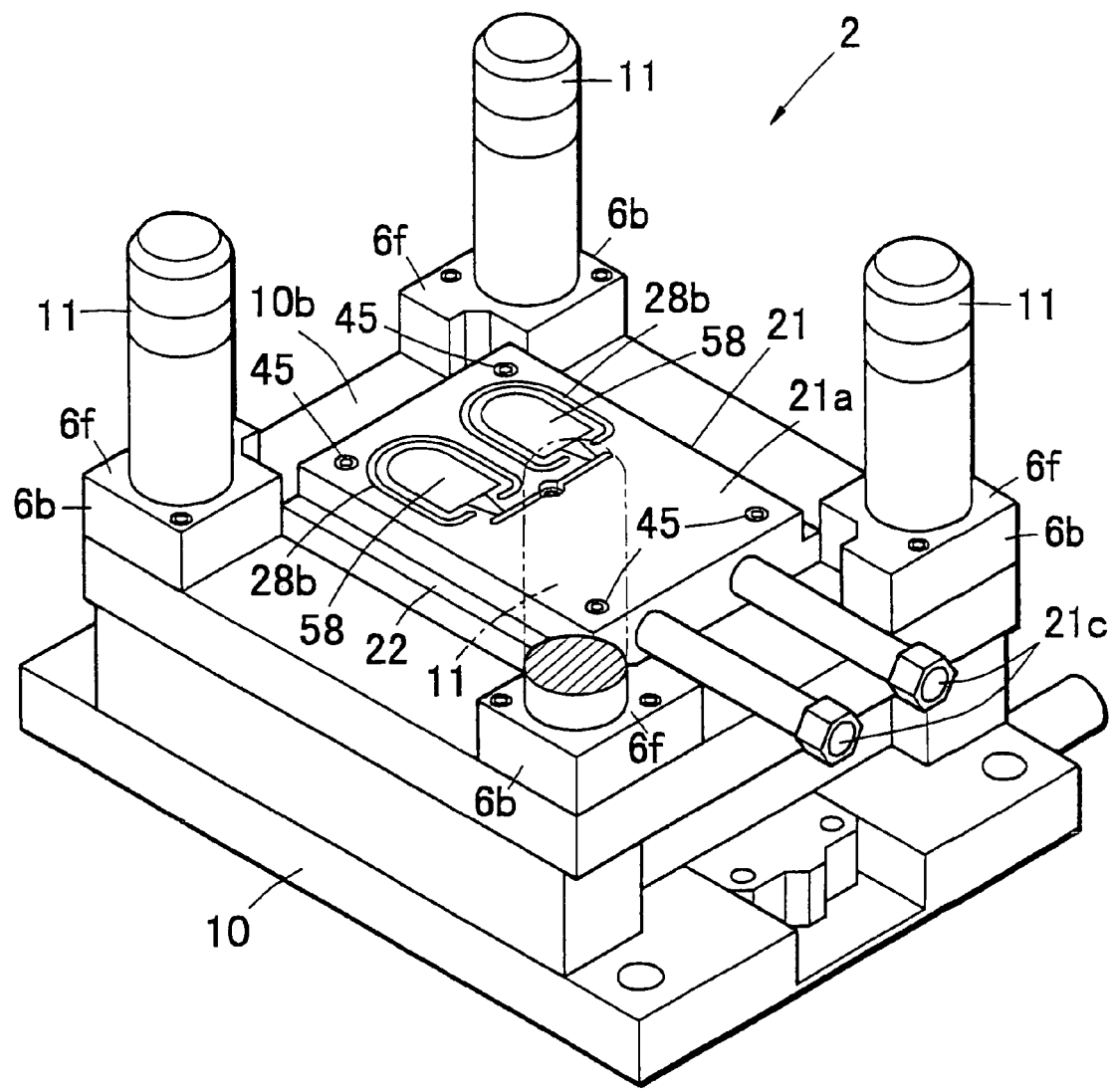
FIG. 14 is a perspective view showing the configuration of a stationary-side mold in the mold for in-mold decoration in the first embodiment of the present invention.

Description is now given of the molds. Molds 1, 2 for in-mold decoration are shown in FIGS. 5 and 14 as one embodiment are molds for use in an in-mold decorating apparatus. The molds are designed to fulfill molding and decoration processes simultaneously on the surface of a thin plate-shaped molded article.

The movable-side mold 1 shown in FIG. 5 and the stationary-side mold 2 shown in FIG. 14 are each composed of cavity-forming blocks 3, 21 having two molding-use cavities 28, 58 for inserting a decorating film thereinto, and mounts (i.e., diesets) 7, 10 for securing the cavity-forming blocks 3, 21.

In the molds 1, 2 according to the present embodiment, the pockets for fitting the nests as provided in the prior art are not provided in the mounts while. Instead, the mounts and the cavity-forming blocks are positioned by protruding portions provided on the mounts in their contact surfaces and recess portions provided on the cavity-forming blocks in their contact surfaces. A plurality of clamping force-receiving portions 6a, 6b are set partly around the cavity-forming blocks. More particularly, the cavity-forming blocks are different from the nests fitted into the pockets.

Figure 6:
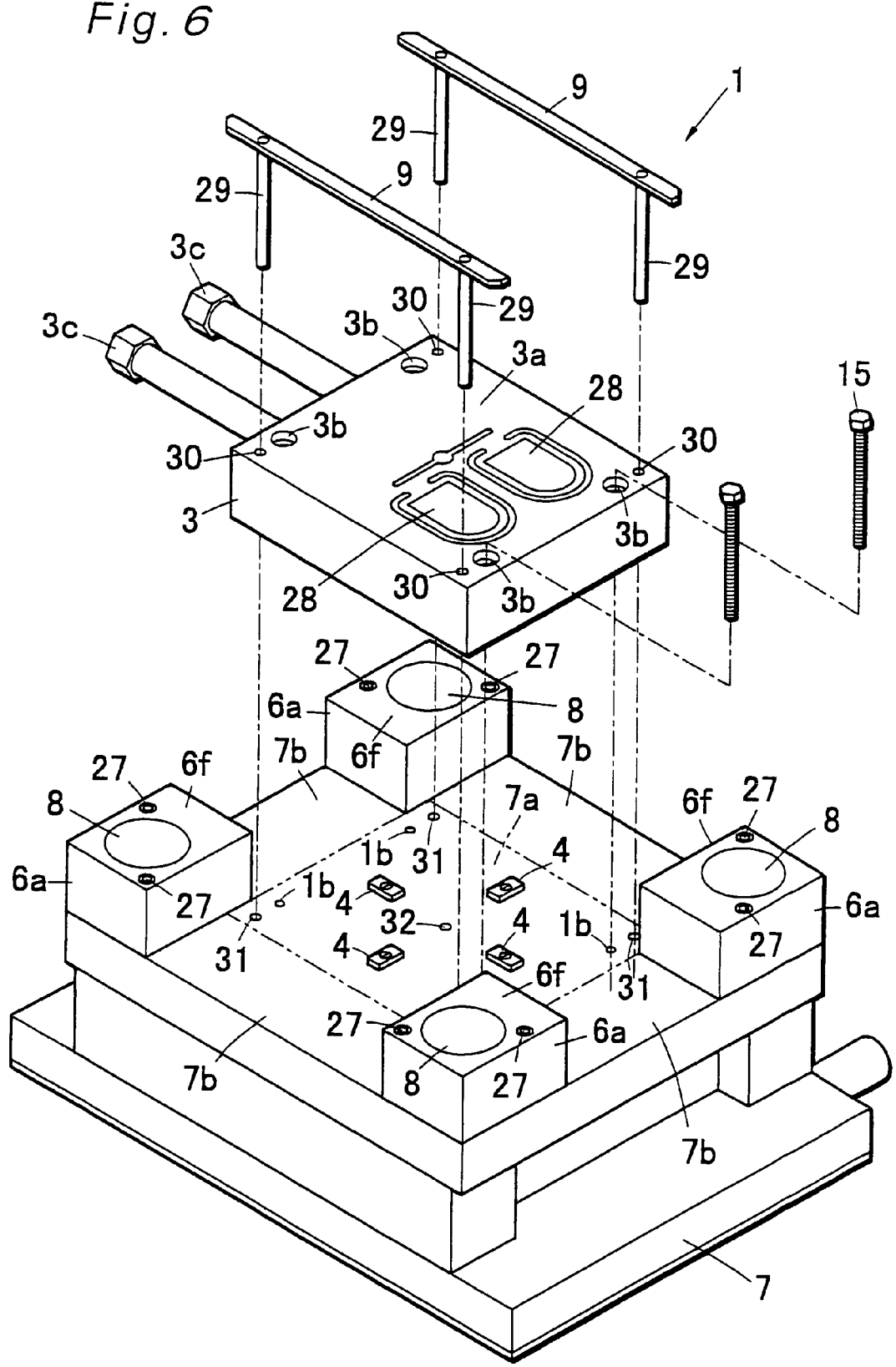
FIG. 6 is an perspective block diagram showing the movable-side mold in the mold for in-mold decoration of FIG. 5.

Description is first given of the movable-side mold. As shown in FIG. 5 and FIG. 6, in the movable-side mold 1, the cavity-forming block 3 is positioned on a mounting face 7a of the mount 7 by later-described protruding portions 4 and recess portions, and fixed by fixing screws 15. Clamping force-receiving portions 6a are provided in corner portions of the surface opposed to the stationary-side mold, the surface (smoothing face 7b) being on the same plane as the mounting face 7a of the mount 7. The clamping force-receiving portions 6a are provided almost symmetrical with respect to a center line of the mold along the film passing direction so that their parting faces are positioned outside the mounting face 7a and outside a later-described passing region of the decorating film 13. The parting faces are the faces which come into contact with the other mold when the clamping force-receiving portions 6a are in joined state, and in this embodiment, the parting faces are equivalent to opposed faces 6f of the clamping force-receiving portions 6a.

Moreover, clamps 9 for retaining the decorating film are attached to the cavity-forming block 3.

In the dieset 7, as shown in FIG. 6, the face opposed to the stationary-side mold 2 is entirely smoothed, and a part of the opposed face functions as the mounting face 7a of the cavity-forming block 3.

Since the mounting face 7a is present on the same plane as the face opposed to the stationary-side mold 2, smoothing of the mounting face can be achieved by smoothing the entire opposed face together with the opposed face other than the mounting face (smoothing face 7b), which allows smoothing to be conducted with ease and with high precision. On the mounting face 7a, there are provided protruding portions 4 for determining the mounting position of the cavity-forming block 3 and for engaging both/the mounting face 7a and the cavity-forming block 3, the detailed description of which will be given later.

As described later, in the cavity-forming block 3, the cavity 28 is provided on a cavity forming-side face 3a. The back face of the cavity forming-side face 3a is smooth and is brought into contact with the mounting face of the dieset 7 when the cavity-forming block 3 is mounted on the dieset 7. The cavity-forming block 3 is mounted on the dieset 7 with use of the fixing screws 15 as described above. In FIG. 6, illustration of the fixing screws 15 is partly omitted. The cavity-forming block 3 has through holes 3b for inserting the fixing screws 15 provided in the vicinity of each corner portion, and the fixing screws 15 passed through the through holes 3b are screwed into screw holes 1b provided on the mounting face 7a of the dieset to fix the cavity-forming block 3 onto the dieset 7.

In four corner portions on the opposed face of the dieset 7, the clamping force-receiving portions 6a are provided. Although the clamping force-receiving portions 6a are structured to be partly in contact with the longitudinal side faces of the cavity-forming block 3, they may be out of contact with the cavity-forming block 3 as described later, as in some cases they are not in contact with the cavity-forming block 3 depending on external dimensions of the cavity-forming block 3 or the like.

Figure 7A:
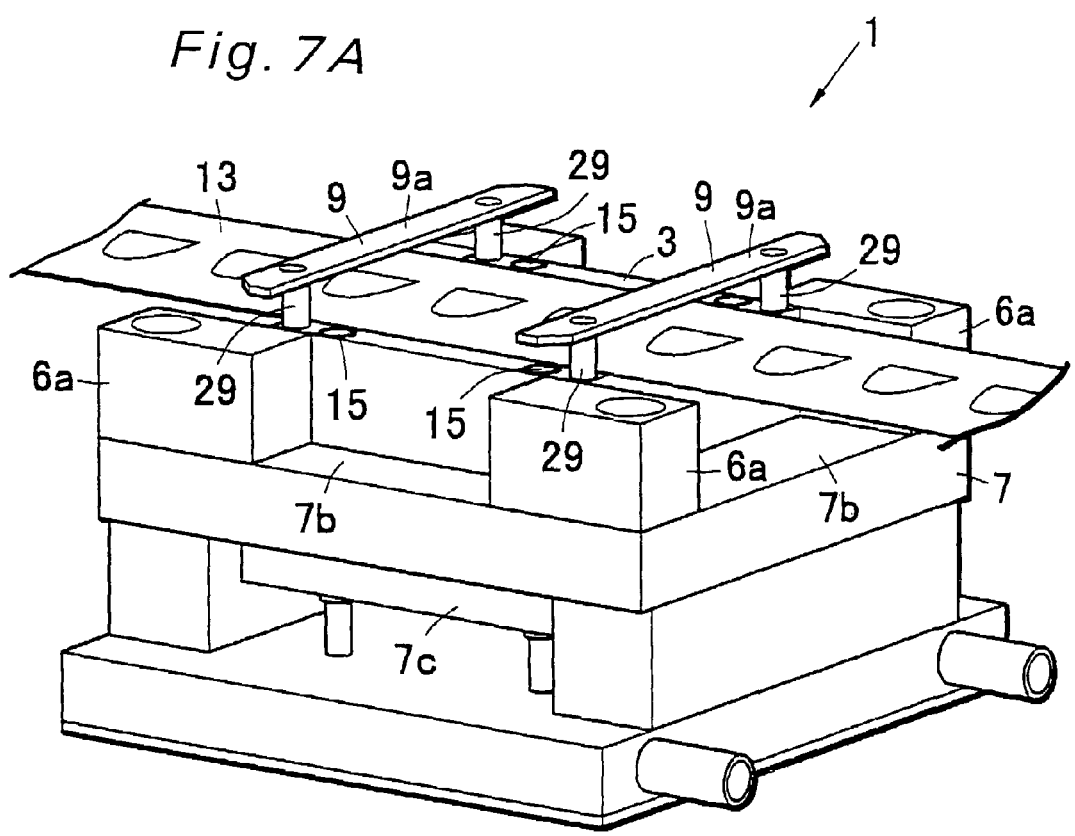
FIGS. 7A and 7B are perspective views each showing the operation of a clamp of the movable-side mold in the mold for in-mold decoration of FIG. 5.
Figure 7B:
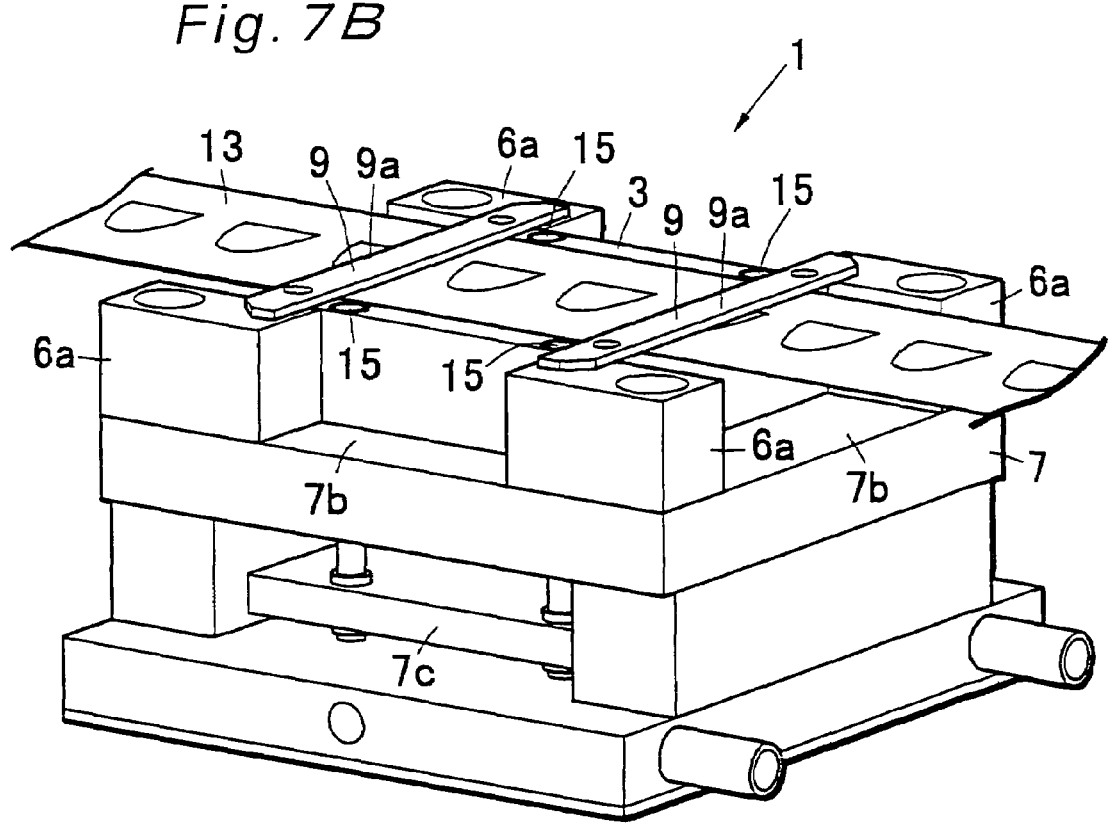

The clamps 9, which are as shown in FIG. 7B to hold the decorating film 13 so as to press the decorating film 13 onto the cavity forming-side face 3a of the cavity-forming block 3, is disposed so that two pieces of the clamp are parallel.

The clamp 9 is composed of an elongated plate-shaped film pressing portion 9a and two through portions 29 each hung vertically from the vicinity of both end portions of the film pressing portion 9a. The through portions 29 go through clamp through holes 30 provided on the cavity-forming block 3 in the state of being fixed to the dieset 7, and are inserted into clamp insertion holes 31 provided on the mounting face 7a of the dieset 7. The dieset 7 is equipped with a clamp moving mechanism 7c connected to the through portions 29 inserted into the clamp insertion holes 31 for moving the clamps 9 up and down so that, as shown in FIG. 7A and FIG. 7B, retention and release of the decorating film can be switched by up and down movement of the clamps 9.

As shown in FIG. 7A, when the clamps 9 are moved up, the decorating film 13 is released from the clamps 9 and can be moved in the longitudinal direction. When the clamps 9 are moved down as shown in FIG. 7B, the decorating film 13 is pressed by the cavity forming-side face 3a of the cavity-forming block 3 by the clamps so that the position is retained. The clamps are moved up mainly when the molds are in an open state so that the decorating film is sent off, whereas the clamps are moved down mainly when the positioning of the decorating film is completed and the decorating film needs to be retained at that position so that molds can be closed and molten resin can be injected, or other processing can be performed.

Figure 8B:
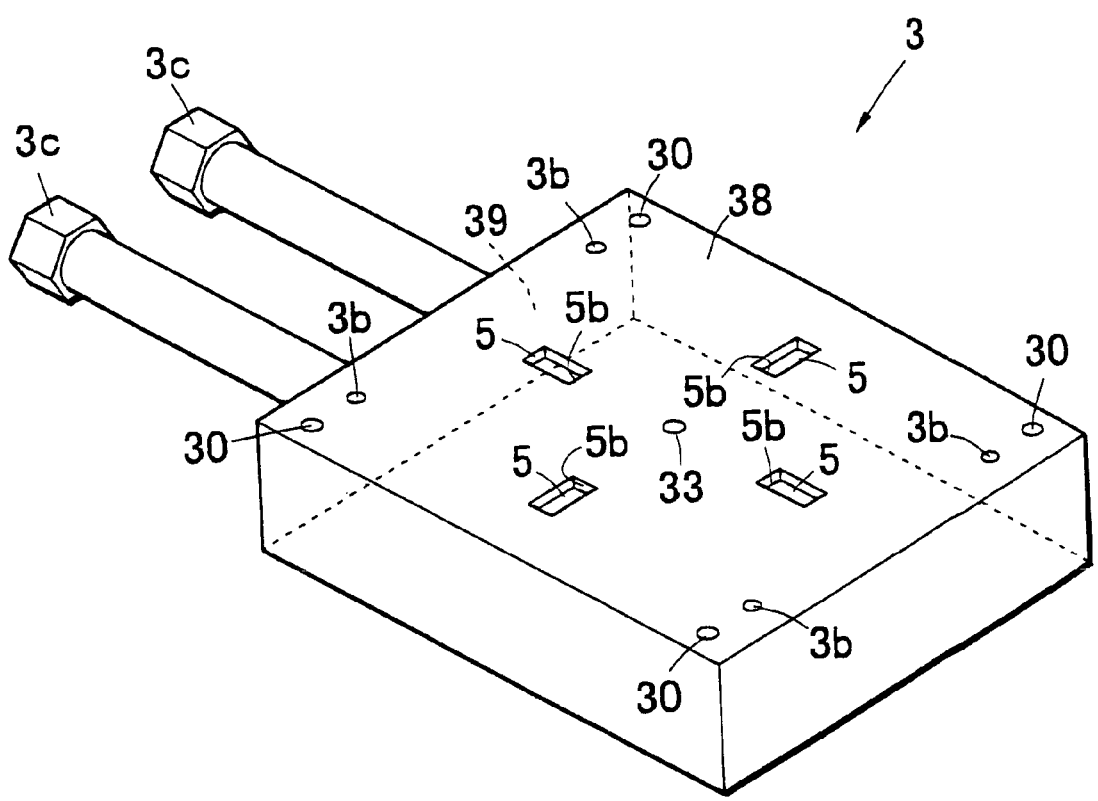
FIG. 8B is a perspective view showing the cavity-forming block for use in the movable-side mold in the mold for in-mold decoration of FIG. 5 viewed from the back face side.

Description is now given of the cavity-forming block for use in the movable-side mold 1. As shown in FIG. 8A and FIG. 8B, the cavity-forming block 3 is a flat plate-shaped article, with one flat face being the cavity forming-side face 3a on which the cavity 28 is formed and the other flat face constituting a fixing face 38 when the cavity-forming block 3 is mounted on the mount. The cavity forming-side face 3a has a groove 28a around the cavity 28 for keeping the decorating film in a stretched state when the molds are closed.

The fixing face 38 has recess portions 5 which engage with protruding portions 4 provided on the mounting face 7a of the dieset 7 for positioning the cavity-forming block on the mounting face 7a. The recess portions 5 are formed into a long hole which is long in radiating direction from a center portion of the cavity-forming block. In the present embodiment, a sprue for injecting molten resin is provided on a center portion of the cavity-forming block 21 (see FIG. 14) of the opposed stationary-side mold, and the long holes provided on the cavity-forming block 3 are formed so as to extend in a radial pattern from the center portion. However, the extending direction of the long holes may be a radial direction around a position corresponding to the position of the sprue of the cavity-forming block 21 in the stationary-side mold. The recess portions 5 are in a long hole shape to cope with expansion or shrinkage of the molds (cavity-forming blocks) when molten resin is injected or cooled. More particularly, the recess portions 5 are formed in a long hole shape extending in a radial direction around the position of the sprue the highest temperature, which makes it possible to decrease displacement from the determined position due to thermal expansion of the molds and the like.

On side face 39 of the cavity-forming block 3, there are provided two coolant feed pipes 3C which are directly connected to a feeder 203 shown in FIG. 1, constituting one coolant flow line through a coolant feed line 40 provided therein.

Moreover, on the cavity-forming block, as described above, the clamp through holes 30 and the through holes 3b for passing the fixing screws 15 are each provided in the corner portions so as to be used for inserting the clamp through portions and fixing the cavity-forming block onto the mount. Further, on the back face (fixing face) 38, there is provided a suction hole 33 linked to the groove 28a, which is used to suck the decorating film 13 to the cavity forming-side face 3a of the cavity-forming block when the block is mounted on the dieset 7 as described later.

Figure 9:
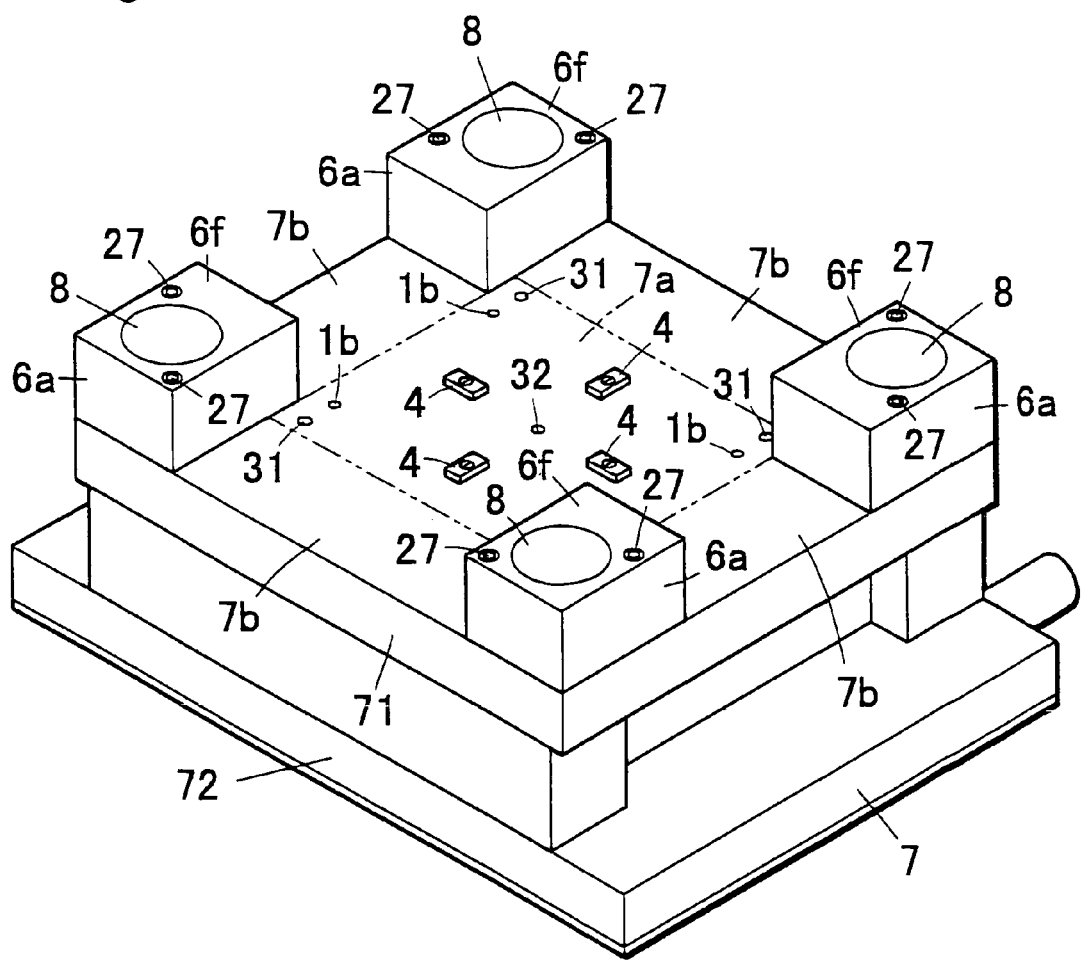
FIG. 9 is a perspective view showing a dieset for use in the mold for in-mold decoration of FIG. 5.
Figure 10:
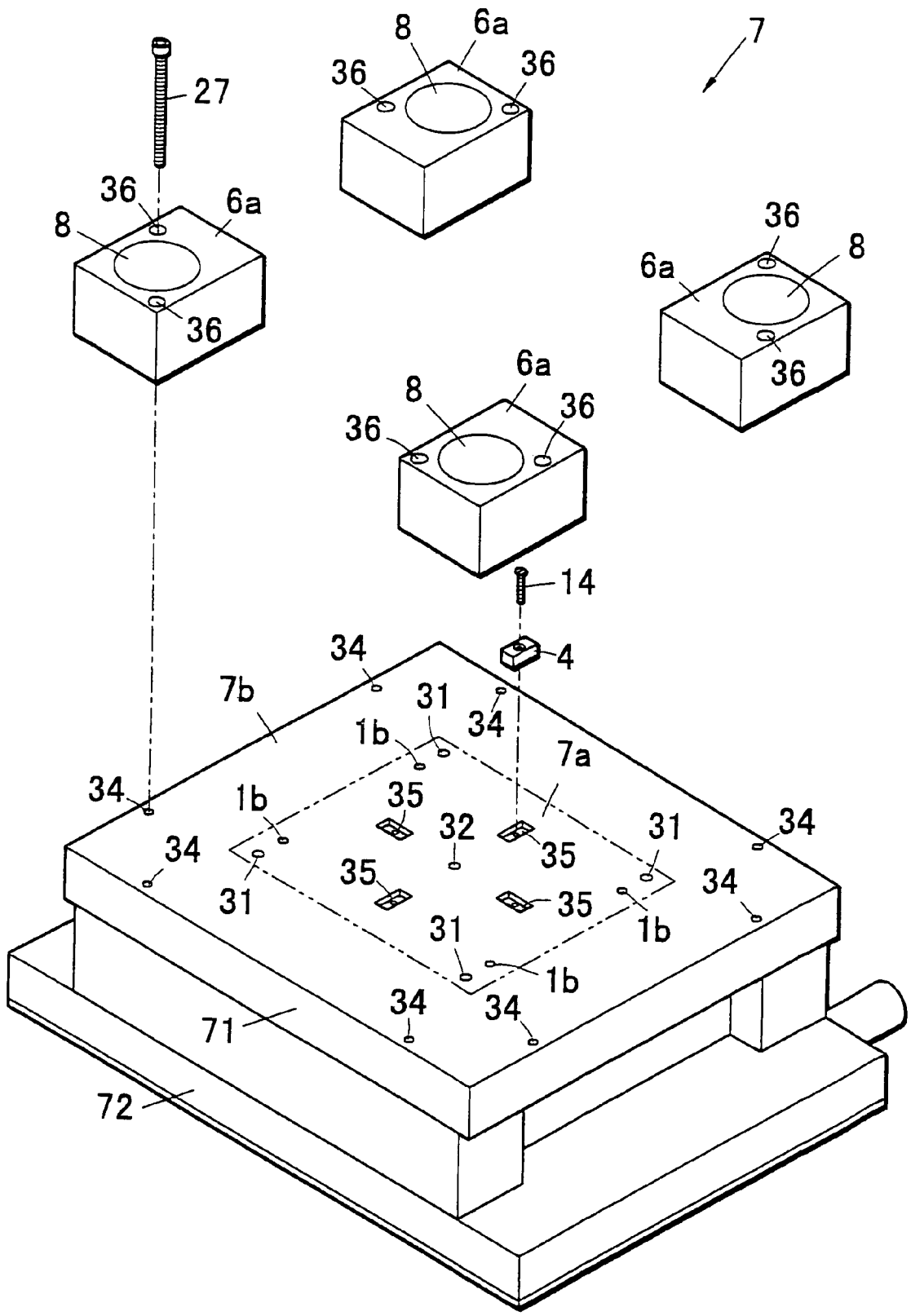
FIG. 10 is a perspective block diagram showing the dieset of FIG. 9.

Description is now given of the dieset 7 for use in the movable-side mold 1. As shown in FIG. 9 and FIG. 10, the dieset 7 has a connecting portion 72 for fixing the dieset 7 to the movable plate 201 of the in-mold decorating apparatus 200, a movable-side clamping plate 71 provided on the connecting portion 72, four clamping force-receiving portions 6a fixed to the movable-side clamping plate 71, and rectangular protruding portions 4 for use in positioning the cavity-forming block. On the connecting portion 72, mechanisms for the cavity-forming block 3 and the clamps 9 are mounted, and at least part of the clamp moving mechanism 7c for moving the clamps up and down as described above and the suction mechanism linked to the suction hole of the cavity-forming block is provided.

The movable-side clamping plate 71 fixes the cavity-forming block 3. As shown in FIG. 10, the face of the clamping plate 71 opposed to the stationary-side mold 2 (the mounting face 7a of the cavity-forming block and the smoothing face 7b) are smoothed as described above. On the opposed face, there are provided fixing screw holes 34 for the clamping force-receiving portions 6a, fixing screw holes 1b for the cavity-forming block 3, clamp insertion holes 31 for the through portions 29 of the clamps 9 to pass through and to reach the clamp moving mechanism 7c, protruding portion fixing recess portions 35 for fixing the protruding portions 4, and suction hole portions 32 for linking the suction hole 33 of the cavity-forming block to the suction mechanism of the connecting portion 72. Since the clamping plate 71 is formed into a plate shape, when the surface of the clamping plate 71 is smoothed prior to provision of the protruding portions 4, various holes 1b, 34, 31, 32, and the protruding portion fixing recess portions 35, polishing is easily conducted and high precision can be secured. As a result, compared to the prior art, a short delivery period can be realized and reduction in manufacturing cost can be achieved.

In the clamping force-receiving portion 6a, two screws 27 are inserted into two screw holes 36 and are screwed into the fixing screw holes 34 on the clamping plate 71 so as to be fixed to the clamping plate 71. It is to be noted that in FIG. 10, only one screw 27 for fixing the clamping force-receiving portions 6a is illustrated and illustration of other screws is omitted. The screw hole 36 is structured such that the head of the screw 27 can be housed inside thereof. The clamping force-receiving portion 6a is for receiving clamping force by an opposed face 6f which is on the side opposed to the stationary-side mold when the movable-side mold 1 and the stationary-side mold 2 are in joined state, and the opposed-side face 6f constitutes the parting face. The clamping force-receiving portion 6a has a guide bush 8, which is used for positioning the stationary-side mold 2 and the movable-side mold 1 when the molds are joined.

Figure 11:
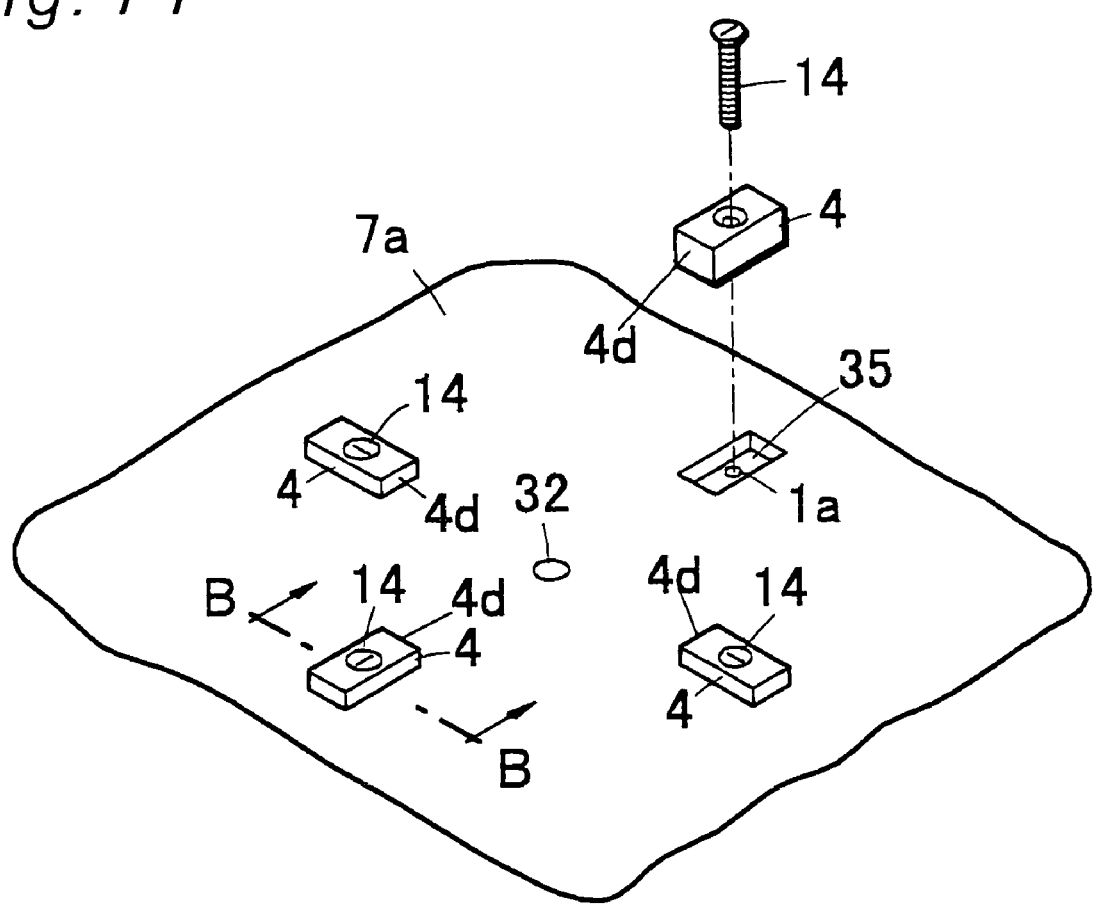
FIG. 11 is a fragmentary enlarged view showing the dieset of FIG. 9.

The protruding portions 4 are engaged with the recess portions 5 of the cavity-forming block 3 for positioning the cavity-forming block when the cavity-forming block is mounted on the mounting face 7a. The protruding portion is in a fox shape, and is fixed by the screw 14 in the state that its lower portion is fitted into the protruding portion fixing recess portion 35 of the clamping plate 71, as shown in FIG. 11. For this purpose, a screw hole 1a is provided in the protruding portion fixing recess portion 35. It is to be noted that the head of the screw 14 is structured to be housed in the screw hole.

Figure 13A:
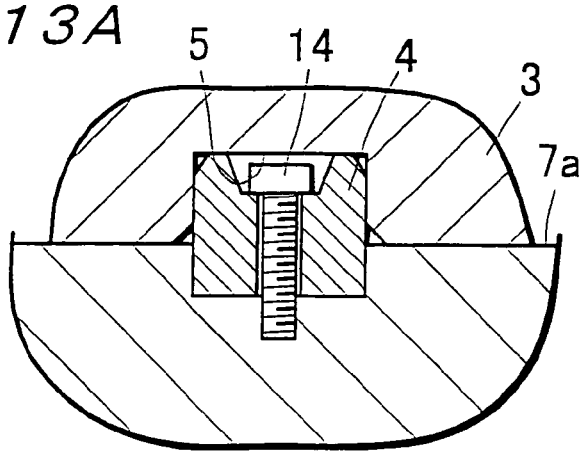
FIG. 13A is an explanatory view showing an engagement state between a cavity-forming block of the movable-side mold in the mold for in-mold decoration of FIG. 5 and the mount.

FIG. 13A shows the engagement state of the protruding portion 4 and the recess portion 5. When the cavity-forming block 3 is mounted on the mounting face 7a, the protruding portion 4 is fitted into the recess portion 5 of the cavity-forming block, by which positioning of both the cavity-forming block 3 and the mounting face 7a are achieved. At this point, the setting place of both the block and the mounting face is adjusted so that a longitudinal external face of the protruding portion 4 and a longitudinal internal face of the recess portion 5 are in contact with each other. Some clearance is provided between two short-side side faces 4d and 5d so that displacement of the mounting position due to thermal expansion and shrinkage of the molds in the molding process can be diminished.

Figure 13B:
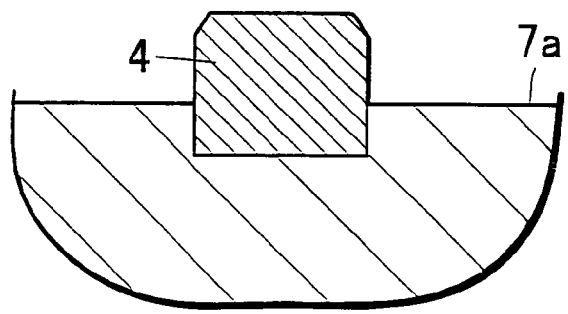
FIGS. 13B, 13C, 13D and 13E are views each showing another configuration example of a mechanism for engaging the cavity-forming block of the movable-side mold and the mount.
Figure 13C:
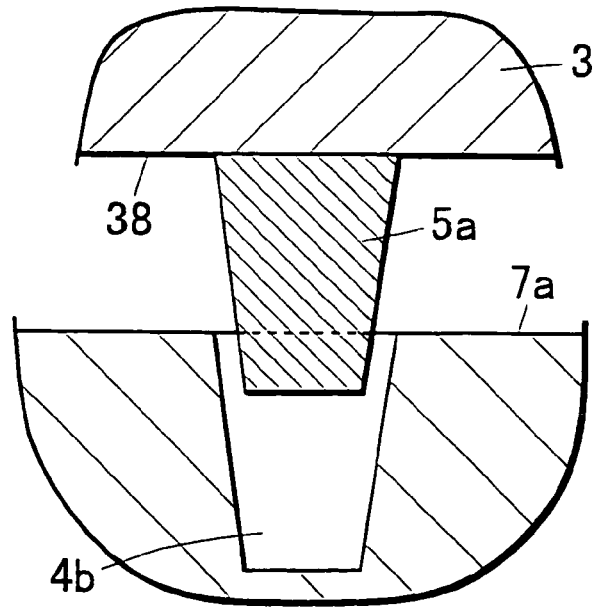
Figure 13D:
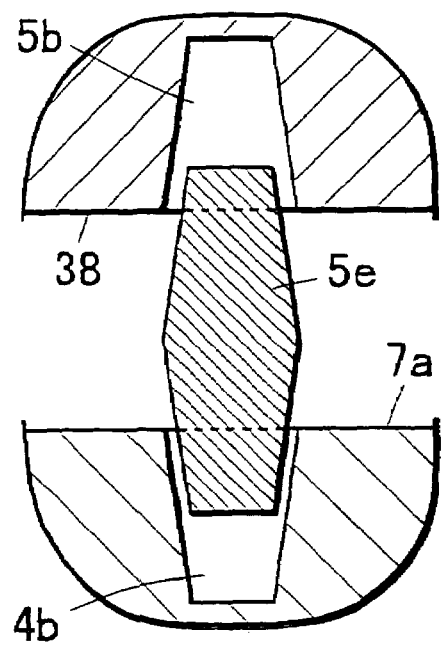
Figure 13E:
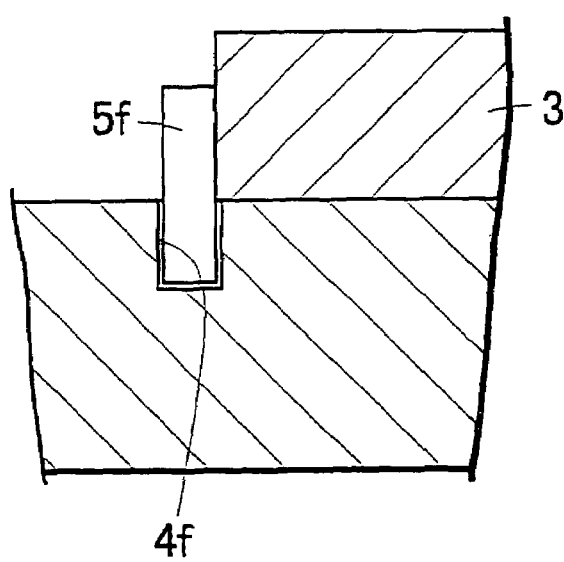

It is to be noted that FIG. 13B, FIG. 13C, FIG. 13D and FIG. 13E are views showing modified examples of the protruding portion 4 and the recess portion 5. FIG. 13B shows an example in which as a means to fix the protruding portion, instead of using the screw 14 for fixing, the protruding portion 4 is simply fitted into the protruding portion fixing recess portion 35. Fixing between the protruding portion 4 and the protruding portion fixing recess portion may be achieved by bonding with use of adhesives and the like. FIG. 13C shows an example in which a protruding portion 5a is provided on the cavity-forming block 3 and a recess portion 4b is provided on the side of the mounting face 7a of the dieset 7. In the case of providing a protruding portion on the cavity-forming block 3, for example as shown in FIG. 13E, a protruding portion 5f may be fixed to the side face of the cavity-forming block 3 instead of the back face 38 of the cavity-forming block, and a recess portion 4f which is engaged with the protruding portion 5f may be provided on the mount. Further, various shapes of the protruding portion may be used including a round pin shape. Further, as shown in FIG. 13D, it is also possible to provide recess portions 5b and 4b on both the back face 38 of the cavity-forming block and the mounting face 7a, and to engage both the recess portions with use of a securing pin 5e which is fitted into both the recess portions 5b and 4b.

Figure 12A:
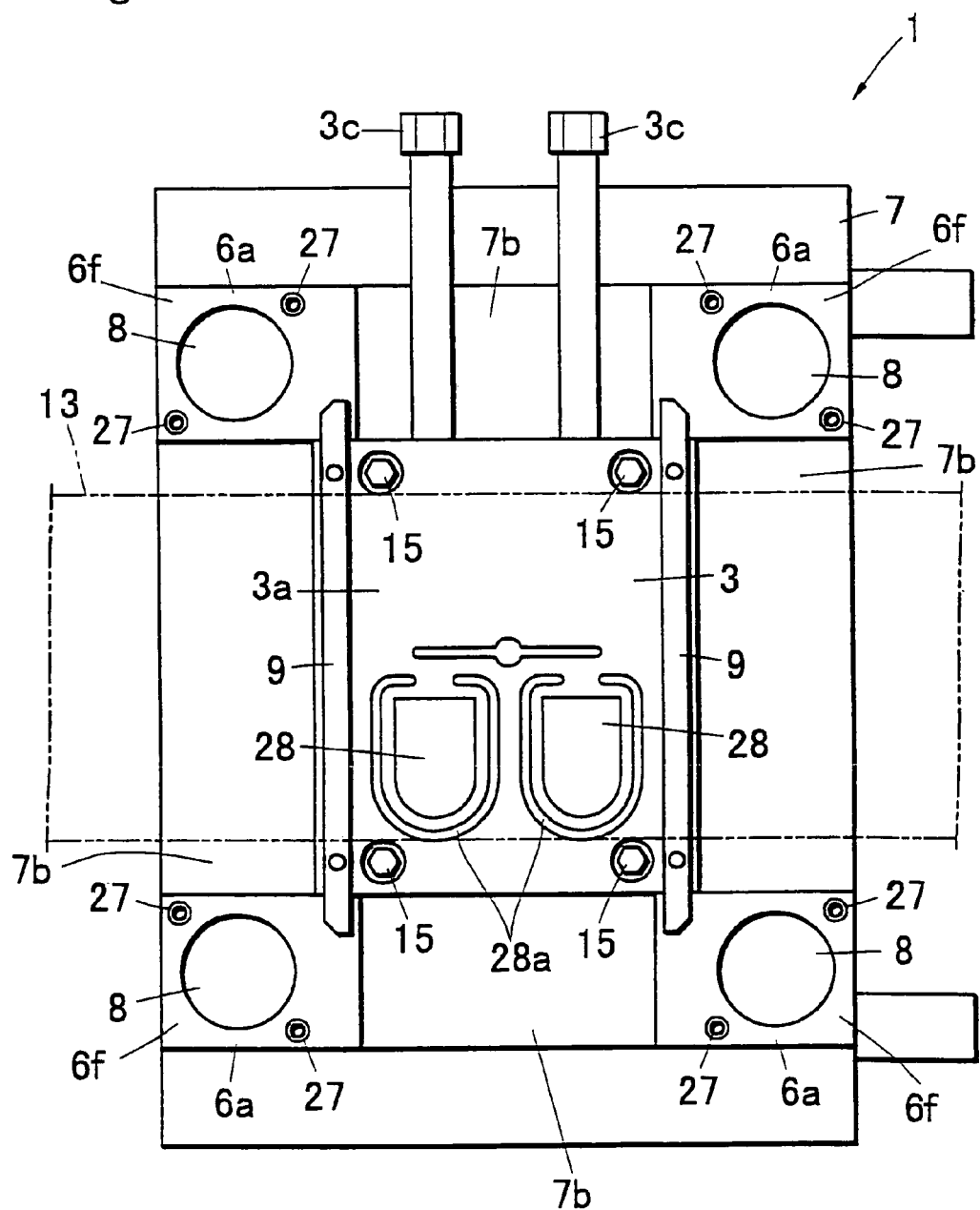
FIG. 12A is a view showing a positional relationship between the movable-side mold in the mold for in-mold decoration of FIG. 5 and a decorating film.
Figure 12B:
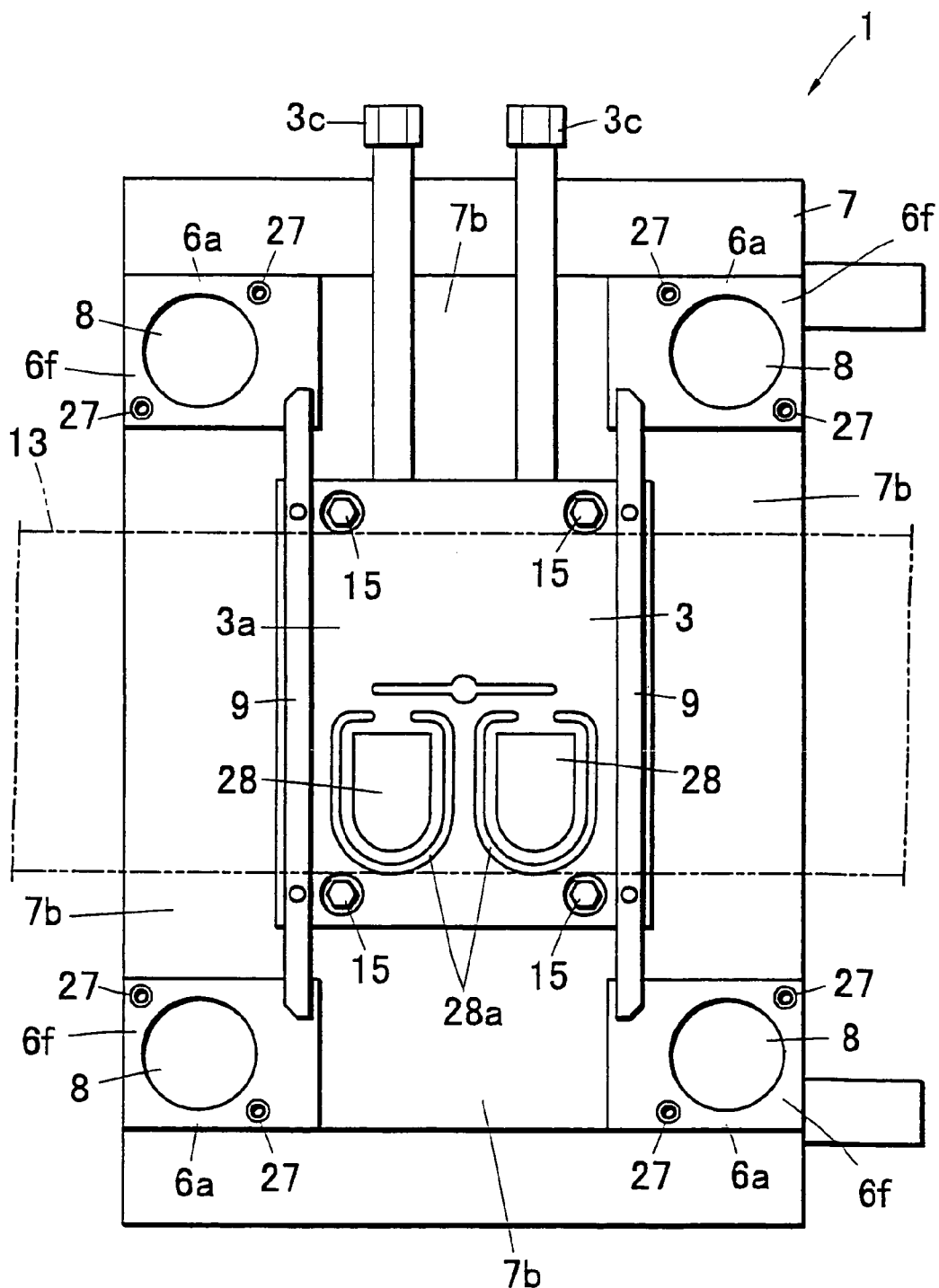
FIG. 12B is a view showing a positional relationship between a movable-side mold and a decorating film according to a modified example of the movable-side mold in the mold for in-mold decoration of FIG. 5.

FIG. 12A is a plane view showing the movable-side mold of FIG. 5. As shown in FIG. 12A, a part of the side face of the cavity-forming block is in contact with the clamping force-receiving portions 6a. However, as with a modified example shown in FIG. 12B, the clamping force-receiving portions may be disposed so as to have a clearance between the cavity-forming block and the clamping force-receiving portions, and all the side faces of the cavity-forming block 3 may be exposed. By structuring so that all the side faces are exposed, the side faces of the cavity-forming block are in contact with air, which hinders heat conduction from the sides faces to the peripheries, thereby allowing the thermal efficiency of the molds to be enhanced. As a result, the molding cycle can be shortened, and the mass-productivity is improved. Also, since temperature control of the molds becomes easier to do, there are less influences on the fluidization, solidification, shrinkage, crystallization, and the like of the molten resin material, so that decorated molded articles can be manufactured stably without the occurrence of deformations such as shrinkage, warpage, and torsion. Further, smooth discharge during the air ventilating and gas ventilating can be achieved, allowing stable manufacturing of the decorated molded articles without the occurrence of gas burns or wrinkles on the decorated molded articles as well as occurrence of close contact failure between the decorating film 13 and the molded articles.

Moreover, since the region through which the decorating film 13 passes does not overlap with the clamping force-receiving portions 6a, the clamping force is not exerted on the decorating film when the molds are closed.

Figure 15:
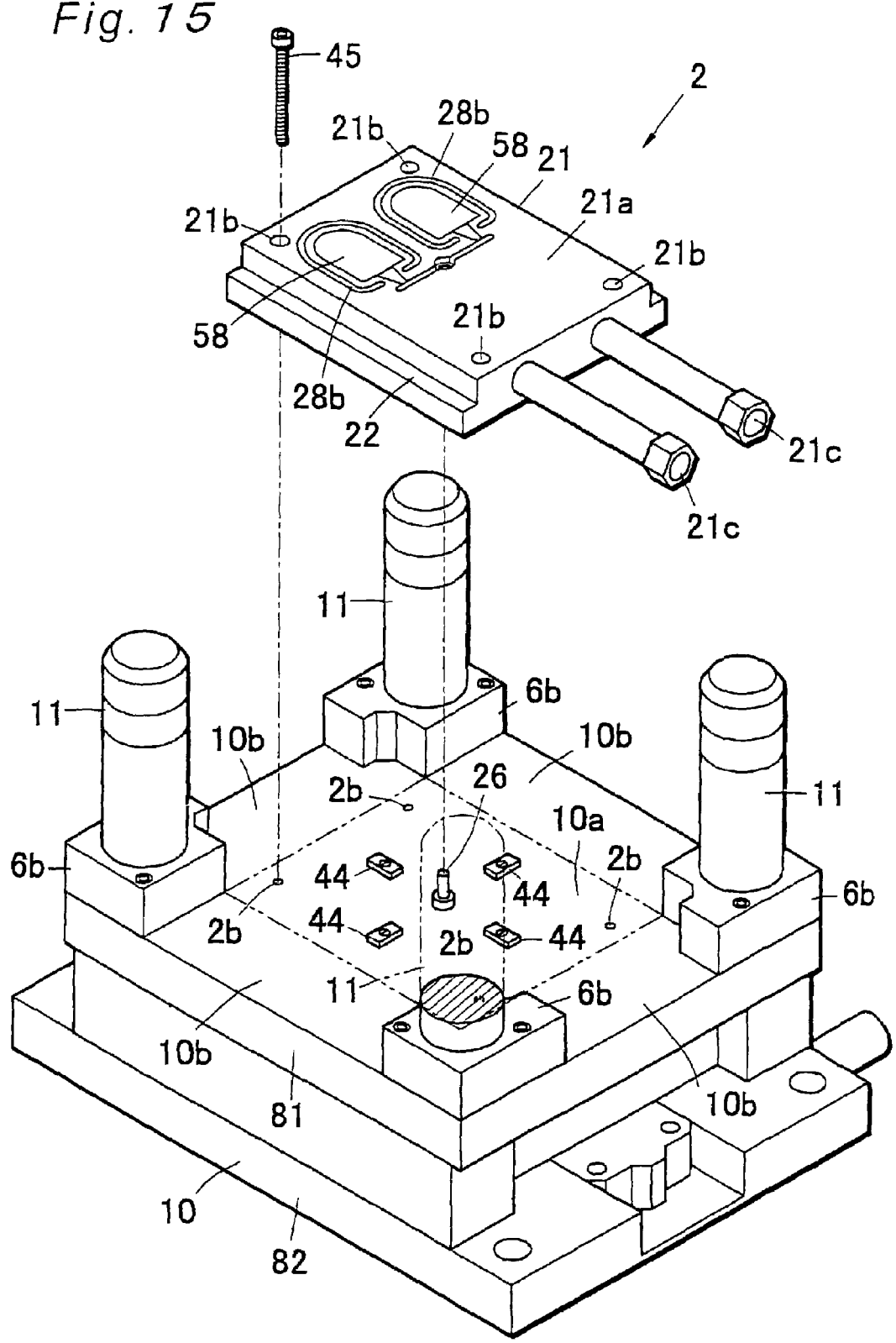
FIG. 15 is a perspective block diagram showing the stationary-side mold of FIG. 14.

Description is now given of the stationary-side mold 2. As shown in FIG. 14 and FIG. 15, in the stationary-side mold 2, the cavity-forming block 21 is positioned on a mounting face 10a of a stationary-side mount 10 by later-described protruding portions 44 and recess portions, and is fixed by fixing screws 45. Clamping force-receiving portions 6b are provided in corner portions of the surface opposed to the movable-side mold 1, the surface (smooth forming face 10b) being on the same plane as the mounting face 10a of the dieset 10. The clamping force-receiving portions 6b are provided so that their parting faces are positioned outside the mounting face 10a and outside the decorating film 13 which is positioned when the movable-side mold is closed. The parting faces are the faces which come into contact with the other mold when the clamping force-receiving portions 6b are in a joined state, and in this embodiment, the parting faces are equivalent to opposed faces 6f of the clamping force-receiving portions 6b.

In the dieset 10, as shown in FIG. 15, the face opposed to the movable-side mold 1 is entirely smoothed, and a part of the opposed face functions as the mounting face 10a of the cavity-forming block 21. Since the mounting face 10a is present on the same plane as the face opposed to the movable-side mold 1, smoothing of the mounting face can be achieved by smoothing the mounting face together with the remaining portion of the opposed face (smoothing face 10b), which allows smoothing such as polishing to be conducted with ease and with high precision. On the mounting face 10a, as shown in FIG. 15, there are provided protruding portions 44 for determining the mounting position of the cavity-forming block 21 and for engaging both the mounting face and the cavity-forming block. Since the protruding portions 44 share the same function as the protruding portions 4 of the movable-side mold, the description thereof is omitted.

As described later, in the cavity-forming block 21, cavity 58 is provided on a cavity forming-side face 21a, while the back face of the cavity-forming block is structured to be smooth and is brought into contact with the mounting face 10a of the dieset 7 when the cavity-forming block 21 is mounted on the dieset 10. The cavity-forming block 3 is mounted on the dieset 7 with use of the fixing screws 45 as with the case of the movable-side mold, and the head of the screw is structured to be housed in a screw hole 21b. In FIG. 15, illustration of the fixing screws 45 is partly omitted. The cavity-forming block 21 has through holes 21b for inserting the fixing screws 45 provided in the vicinity of each corner portion, and the fixing screws 45 passed through the through holes 21b are screwed into screw holes 2b provided on the mounting face 10a of the dieset to fix the cavity-forming block 21 to the dieset 10.

In four corner portions on the opposed face of the dieset 10, the clamping force-receiving portions 6b are provided. The clamping force-receiving portions 6b have a notch so as to prevent interference between the clamps 9 of the movable-side mold 1 and the clamping force-receiving portions 6b when the movable-side mold 1 and the stationary-side mold 2 are closed, and are structured to be away from the cavity-forming block 21 when the cavity-forming block 21 is mounted.

The cavity-forming block 21 shares almost the same configuration with the cavity-forming block 3 used in the movable-side mold 1 except that: the cavity-forming block 21 has notches 22 to prevent interference between the clamps 9 of the movable-side mold 1 and the clamping force-receiving portions 6b when the movable-side mold 1 and the stationary-side mold 2 are closed; there is provided a sprue for sending molten resin injected from the injection nozzle 205 of the in-mold decorating apparatus 200 into the cavity; there is provided a pressing portion 28b which is fitted into the groove 28a for keeping the decorating film 13 interposed between the movable-side mold 1 and the stationary-side mold 2 in a stretched state when both the molds are closed; and the inserting holes for retaining the clamps and the suction holes are not provided.

The stationary-side mold has a connecting portion 82 for fixing the dieset 10 to the stationary plate 202 of the in-mold decorating apparatus 200, a movable-side clamping plate 81 provided on the connecting portion 82, four clamping force-receiving portions 6b fixed onto the clamping plate 81, and rectangular parallelepiped protruding portions 44 for use in positioning the cavity-forming block. The connecting portion 82 has a connecting hole 10c (see FIG. 17A) provided on its back face to be connected to a nozzle 205 for injecting molten resin.

The clamping plate 81 is for fixing the cavity-forming block 21. As shown in FIG. 15, the face of the clamping plate 81 opposed to the movable-side mold 1 (the mounting face 10a of the cavity-forming block and the smoothing face 10b) are smoothed as described above. On the opposed face, there are provided fixing screw holes (unshown) for the clamping force-receiving portions 6b, fixing screw holes 2b for the cavity-forming block 3, protruding portion fixing recess portions (unshown) for fixing the protruding portions 44, and a feed port 26 for feeding the molten resin sent from a nozzle insertion 10c (see FIG. 17B) to the sprue of the cavity-forming block 21. Since the clamping plate 81 is formed into a plate shape, when the surface of the clamping plate 81 is smoothed prior to provision of the protruding portions 44, various holes and the protruding portion fixing recess portions, polishing is easily conducted and high precision can be secured.

In the clamping force-receiving portion 6b, screws (unshown) are inserted into two screw holes and are screwed into fixing screw holes on the clamping plate 81 so as to be fixed to the clamping plate 81. The screw hole is structured such that the head of the screw can be housed inside thereof. The clamping force-receiving portion 6b is for receiving clamping force when the movable-side mold 1 and the stationary-side mold 2 are in closed state, and the face opposed to the movable-side mold 1 constitutes the parting face. The clamping force-receiving portion 6b has a guide pin 11, which is fitted into the guide bush 8 of the clamping force-receiving portion 6a of the movable-side mold 1 when the stationary-side mold 2 and the movable-side mold 1 are joined so as to be used for positioning both the molds. The protruding portions 44 are engaged with the recess portions (unshown) of the cavity-forming block 21 for positioning the cavity-forming block when the cavity-forming block is mounted on the mounting face 10a. Adjustment of the setting places and the means for fixing the protruding portions can be set as in the same manner as with the case of the movable-side mold.

Figure 17A:
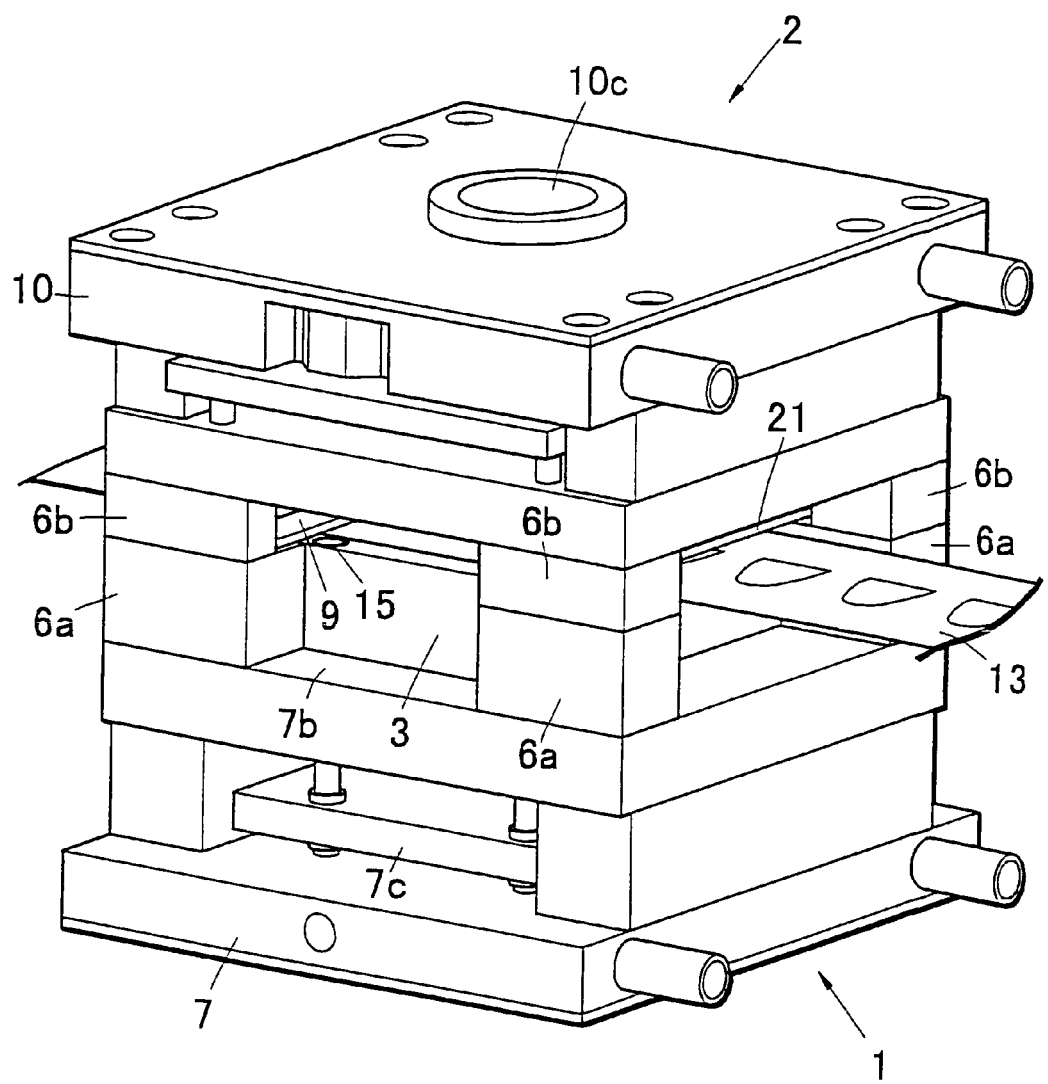
FIG. 17A is a perspective view showing a bonding state between the movable-side mold of FIG. 5 and the stationary-side mold of FIG. 14.
Figure 17B:
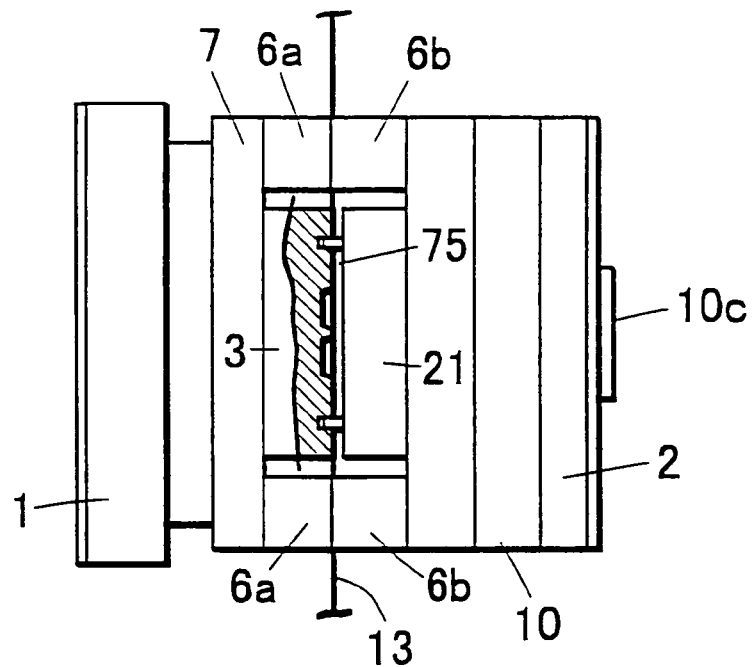
FIG. 17B is a fragmentary cross-sectional side view showing a bonding state between the movable-side mold of FIG. 5 and the stationary-side mold of FIG. 14.

FIG. 17A is a perspective view showing the movable-side mold 1 and the stationary-side mold 2 according to the present embodiment in closed state. FIG. 17B is a schematic side view showing the movable-side mold 1 and the stationary-side mold 2 according to the present embodiment in closed state. In both the molds 1, 2, the clamping force-receiving portions 6a, 6b receive clamping force in joined state, and both contact faces function as parting faces. In the state where both the molds are closed, a slim clearance 75 is formed between the cavity forming-side faces 3a and 21a of two cavity-forming blocks 3 and 21. In the present embodiment, since the cavity forming-side faces 3a, 21a of two cavity-forming blocks 3, 21 are structured to be slightly lower than the opposed face 6f of the clamping force-receiving portions 6a, 6b of each mold when viewed from the mounting faces 7a, 10a, the clearance 75 is formed when both the molds are joined.

The dimension D (i.e., depth) of the clearance 75 may be any dimension which can prevent clamping force of both the molds 1, 2 from being exerted on the decorating film 13, and therefore the dimension D may be, for example, almost identical to the thickness of the decorating film 13.

Figure 17C:
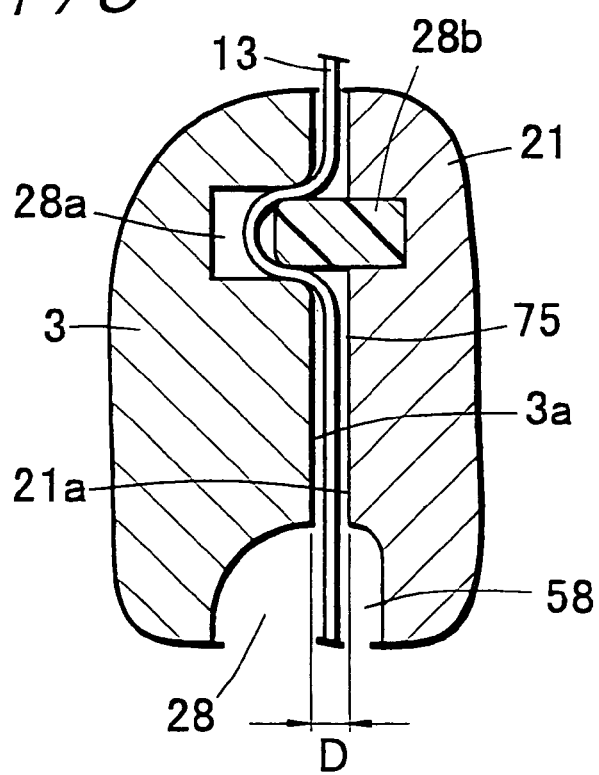
FIG. 17C is a fragmentary enlarged view of FIG. 17B.

FIG. 17C is a fragmentary enlarged cross sectional view of FIG. 17B. As shown in FIG. 17C, when the molds are in joined state, the groove 28a and the pressing portion 28b provided around the cavities 28, 58 of two cavity-forming blocks 3, 21 are engaged with each other with the decorating film 13 interposed in between, as a result of which the decorating film is stretched by these portions, resulting in elimination of wrinkles on the decorating film. By injecting molten resin in this state, it becomes possible to solve such problem as displacement of design patterns due to the wrinkles on the film.

Figure 16:
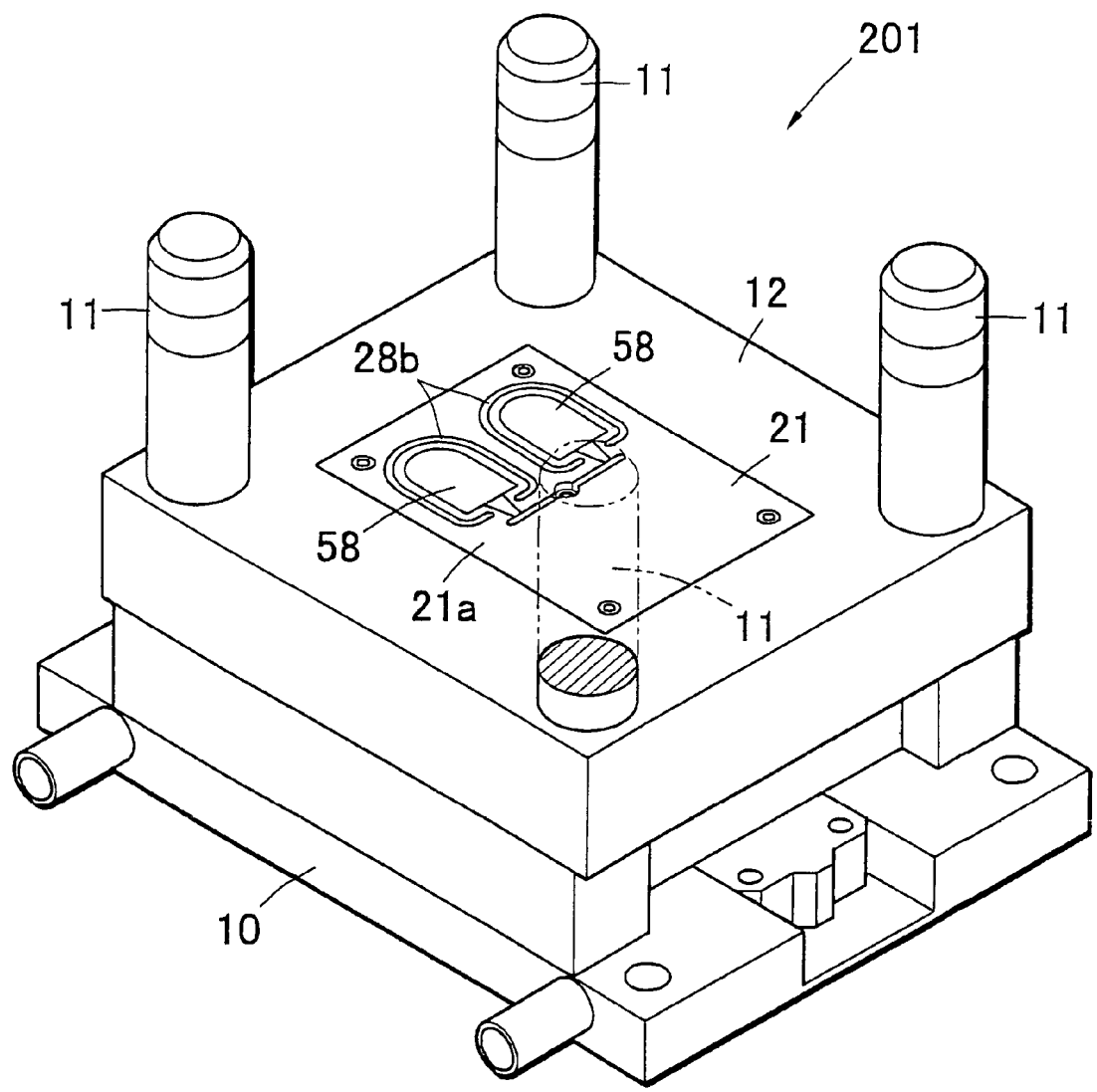
FIG. 16 is a perspective view showing the configuration of a modified example of the stationary-side mold in the mold for in-mold decoration in the first embodiment of the present invention.

Although in the present embodiment, the cavity-forming block is mounted on the mounting portion through engagement of the protruding portion and the recess portion without provision of the pockets on both the stationary-side mold and the movable-side mold, it is possible, for example, to use a mold with a pocket as one of the molds. For example, a stationary-side mold shown in FIG. 16 may be used in combination with the movable-side mold shown in FIG. 5. It is to be noted that in this case, though not clarified in the drawings, it is preferable to provide notches to prevent interference with the clamps provided on the movable-side mold 1.

Figure 18A:
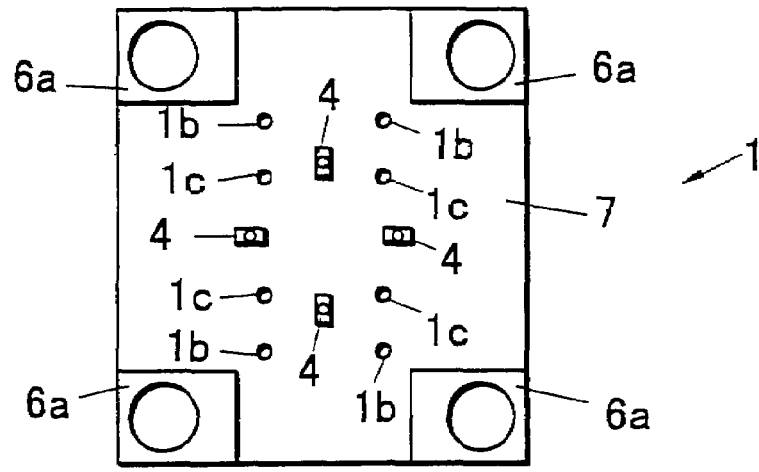
FIG. 18A is a view showing the configuration of a dieset for mounting a cavity-forming block other than the cavity-forming block shown in FIGS. 8A and 8B on the movable-side mold of FIG. 5.
Figure 18B:
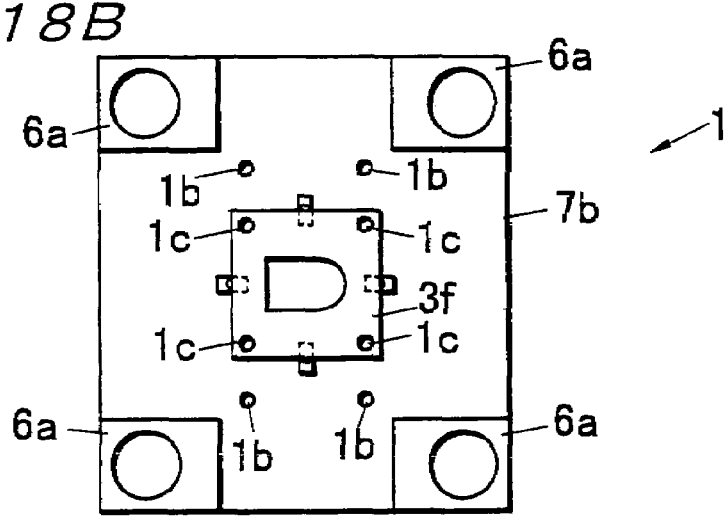
FIG. 18B is a view showing a state that the cavity-forming block other than the cavity-forming block shown in FIGS. 8A and 8B is mounted on the movable-side mold of FIG. 5.

It is to be noted that since the molds according to the present embodiment do not have a pocket into which the nest is fitted as in the case of the prior art, changes in number or size of molded articles which are to be molded at a time can be managed by only preparing a new cavity-forming block 3 of necessary dimensions, while the movable-side mount 7 and the stationary-side mount 10 also can be shared as standardized parts on other occasions of mold assembly. More particularly, referring to the movable-side mount 7 shown in FIG. 18A as example, on the opposed face of the cramping plate of the movable-side mount 7, screw holes 1b, 1c are provided at the positions corresponding to the through holes 3b of the cavity-forming blocks 3 in a plurality of sizes, and if a small cavity-forming block is used as shown in FIG. 18B, the block is fixed with use of the screw hole 1c. In this case, the protruding portions 4 are provided at the positions close to the center of the clamping plate, so that the protruding portions can be shared. As a result, it becomes possible to meet shorter delivery periods and reduce the manufacturing cost, compared with the prior art.

Figure 18C:
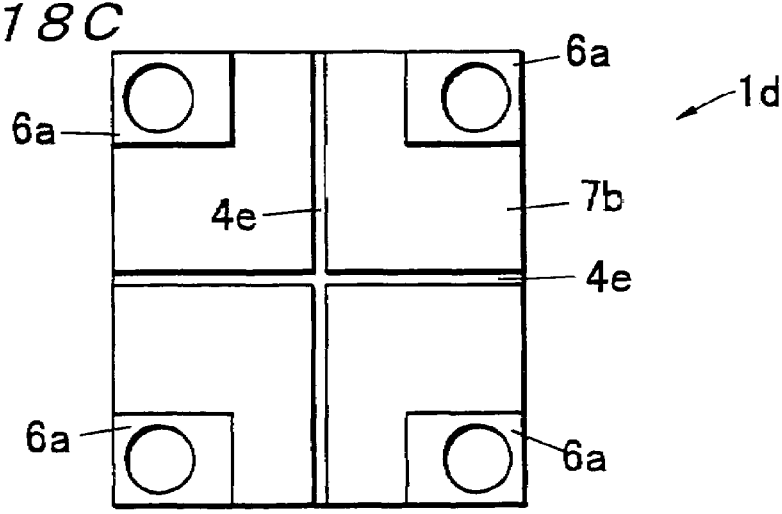
FIG. 18C is a view showing the configuration of a dieset in an modified example of the movable-side mount for mounting still another cavity-forming block other than the cavity-forming block shown in FIGS. 8A and 8B on the movable-side mold of FIG. 5.

Further, an orthogonal groove 4e as shown in FIG. 18C is provided. On the back face of the cavity-forming block 3, a cruciform protrusion (unshown) which can be fitted into the groove 4e is provided, so that regardless of the size of the cavity-forming block 3, positioning of the plate and the block can be achieved.

In addition to the aforementioned effect, since the molds according to the present embodiment have no pocket into which the cavity-forming blocks 3, 21 are fitted, it is unnecessary to do clearance adjustment for air ventilating or gas ventilating with respect to the portions of the movable-side mount 7 and the stationary-side mount 10 surrounding the cavity-forming blocks 3, 21. As a result, it becomes possible to meet shorter delivery periods and reduce the manufacturing cost, compared with the prior art.

It is to be noted that fixing of the cavity-forming blocks 3, 21 should preferably be conducted from the cavity forming-side faces 3a, 21a of the cavity-forming blocks, though it is also possible to conduct fixing through screw fixing from the dieset side. In the case of screw fixing from the cavity-forming side face, the cavity-forming block 3 can be easily separated off from the in-mold decorating apparatus by undoing the screw that has been tightened from the cavity-forming side face, so that the cleaning and maintenance of the mold, which have been requisites for in-mold decoration engineering method, become easily achievable with high precision.

It is noted here that molded articles to which an in-mold decoration method is applicable with use of the molds according to the present embodiment should preferably be applied to those having relatively low product side walls as low as 10 mm or less in terms of the characteristics including the steps of continuously feeding the printed or otherwise worked decorating film into a mold, doing injection molding with the decorating film laid along the cavity configurations of the cavity-forming blocks 3, 21, and integrating the printed layer or the like with the molded article surface by resin pressure and heat in the molding process. Therefore, it is often the case that the resin pressure to be exerted in the opening/closing direction of the movable-side mount 7 and the stationary-side mount 10 is smaller within the cavity. Thus, under such special conditions, even if the cavity-forming blocks 3, 21 are set to the movable-side mount 7 and the stationary-side mount 10 without pocket machining, the resin pressure can be countered by the strength of the cavity-forming blocks 3 and 21 alone, making it practicable to build a constitution like the present invention.

Further, the number and setting places of the clamping force-receiving portions 6a, 6b of the molds for in-mold decoration may be set as required only if the side faces of the cavity-forming blocks 2, 21 are partly or entirely exposed, and the parting function and the above-described functions can be obtained. Also, these clamping force-receiving portions 6a, 6b have no relations to the types of molded articles, and so can be shared by other in-mold decoration use molds.

Further, the clearance adjustment in the cavity-forming blocks 2, 21 for air ventilating and gas ventilating can be performed by adjusting the height of the clamping force-receiving portions 6a, 6b. For example, the clearance adjustment can be performed by polishing the opposed face 6F or inserting a thin plate in between the clamping force-receiving portions 6a, 6b and the clamping plates 71, 81 when the clamping force-receiving portions 6a, 6b is fixed to the clamping plates 71, 81 with the screws. Therefore, partial clearance adjustment is easily achievable. As a result, it becomes possible to meet shorter delivery periods and reduce the manufacturing cost, compared with the prior art.

SECOND EMBODIMENT

Description is now given of molds for in-mold decoration according to a second embodiment of the present invention.

Figure 19:
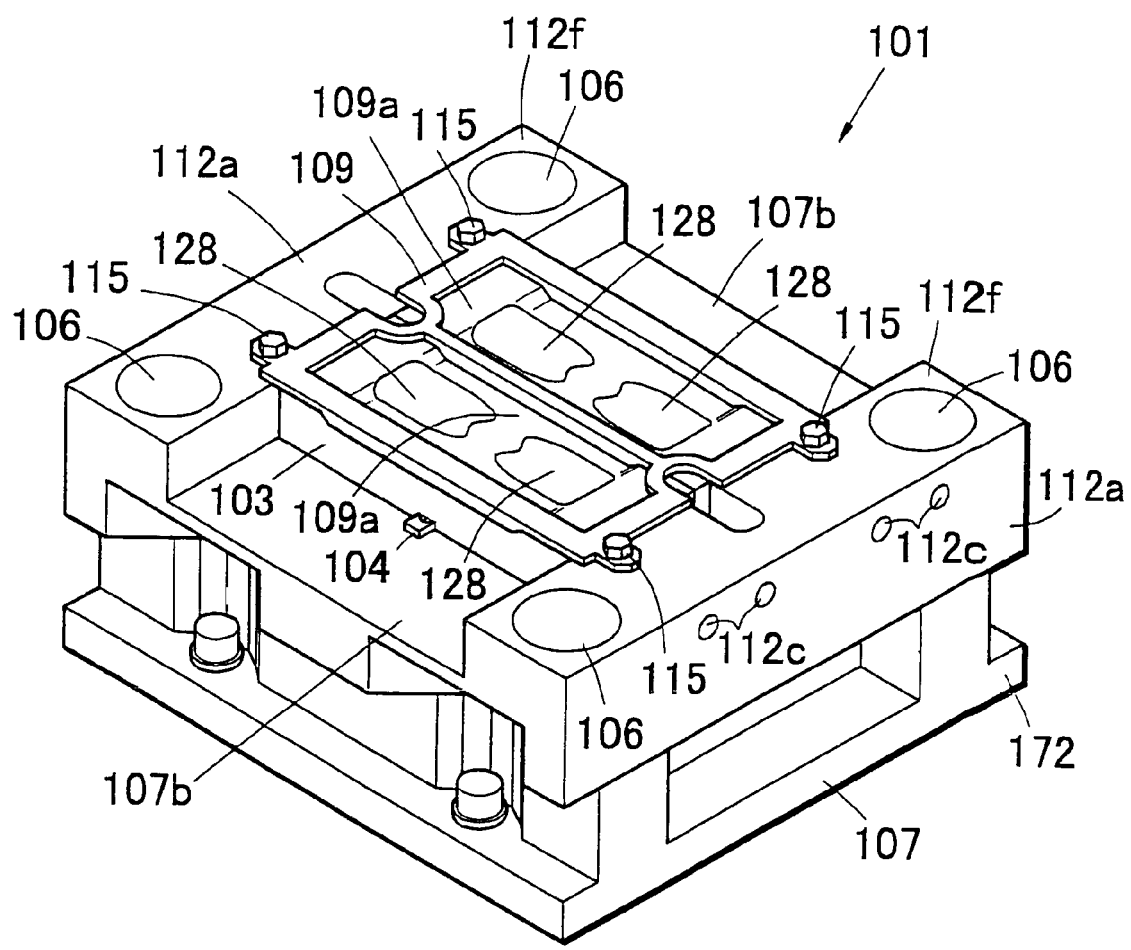
FIG. 19 is a perspective view showing the configuration of a movable-side mold in a mold for in-mold decoration in a second embodiment of the present invention.
Figure 23:
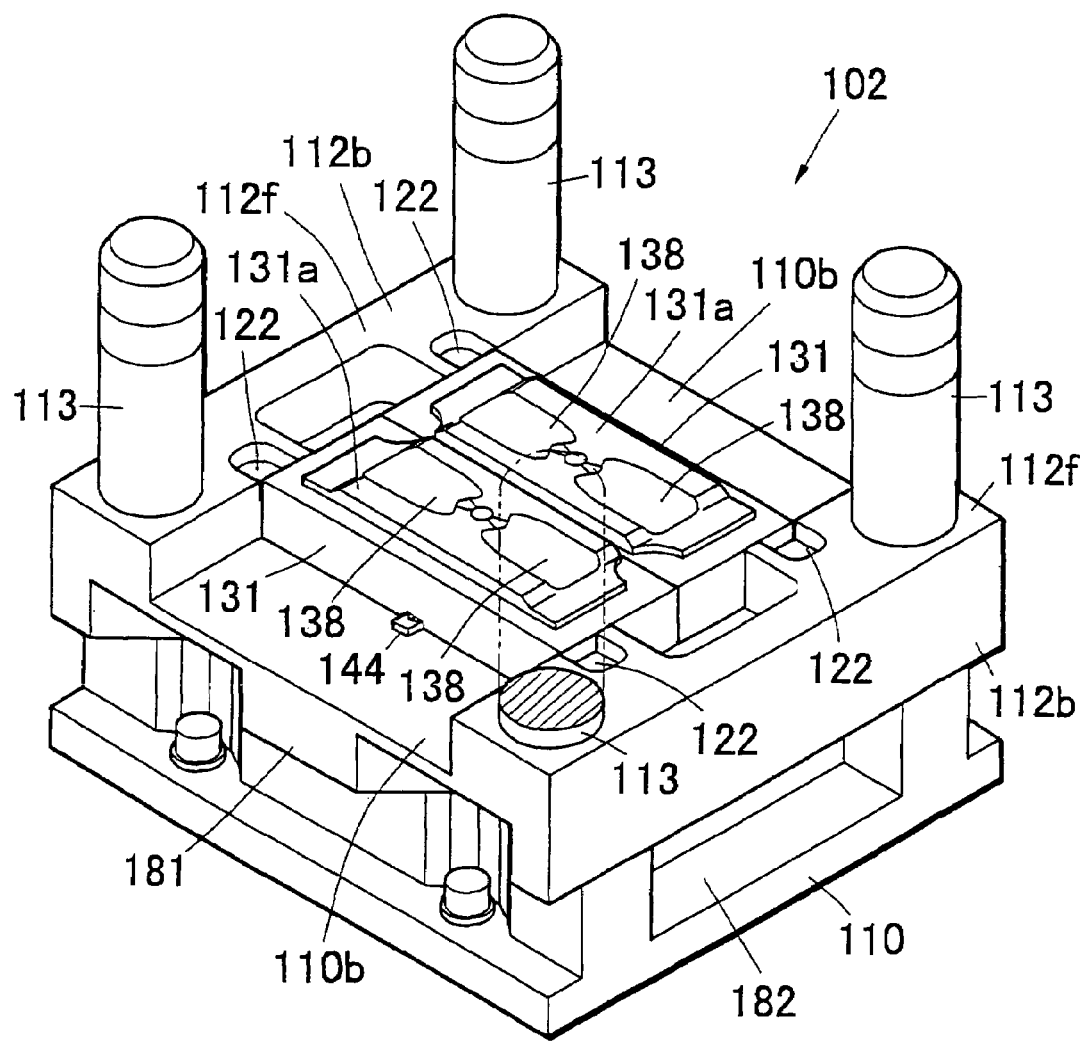
FIG. 23 is a perspective view showing the configuration of a stationary-side mold in the mold for in-mold decoration in the second embodiment of the present invention.
Figure 24A:
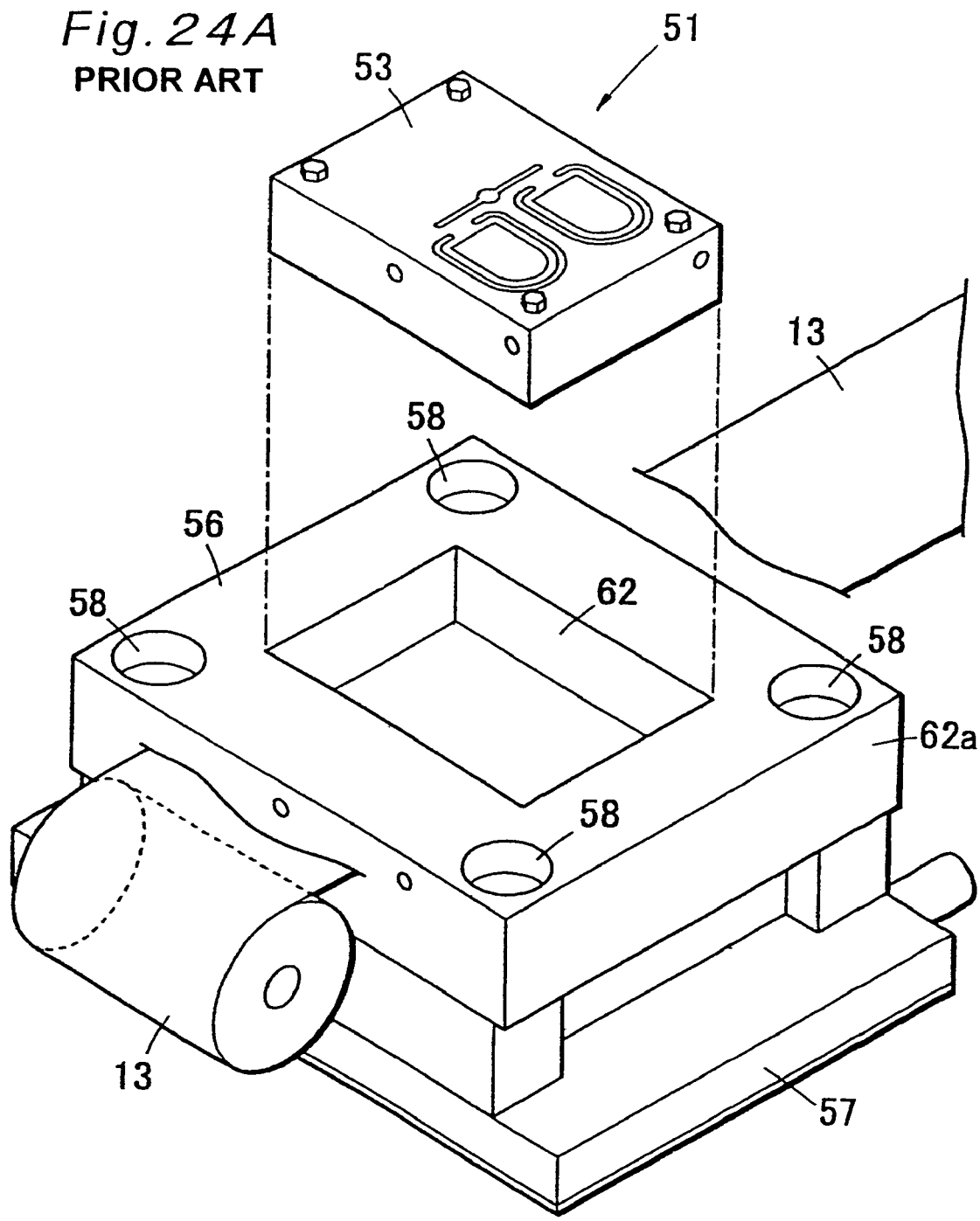
FIG. 24A is a perspective view showing a movable-side mold in a mold for in-mold decoration according to the prior art.
Figure 24B:
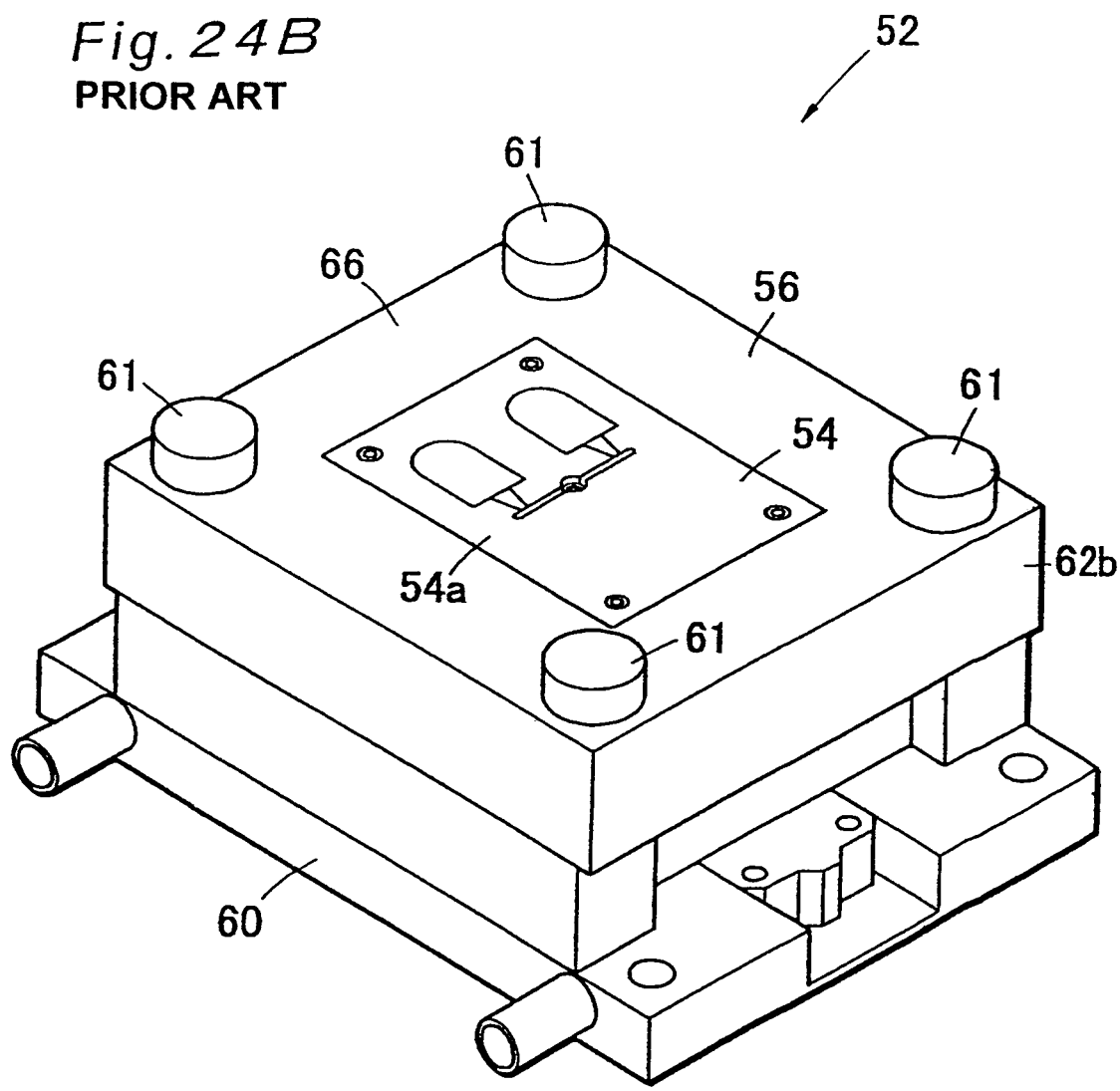
FIG. 24B is a perspective view showing a stationary-side mold in the mold for in-mold decoration according to the prior art.

Molds for in-mold decoration 101, 102 shown as the second embodiment in FIG. 19 and FIG. 23 are the molds for use, for example, in the in-mold decorating apparatus shown in FIG. 1, which are purposed to fulfill molding and decoration processes simultaneously on the surface of a thin plate-shaped molded article. A movable-side mold 101 shown in FIG. 19 and a stationary-side mold 102 shown in FIG. 23 are each composed of cavity-forming blocks 103, 131 having two pieces of molding-use cavities 128, 138 into which a decorating film is inserted and mounts 107, 110 each for fixing two pieces of the cavity-forming blocks 103, 131.

In the molds 101, 102 according to the present embodiment, such pockets for fitting the nests thereinto as would be provided in the prior art are not provided in the mounts. Instead, the mounts and the cavity-forming blocks are positioned by protruding portions provided on the mounts in their contact surfaces, and recess portions provided on the cavity-forming blocks in their contact surfaces. Further, a plurality of clamping force-receiving portions 112a, 112b integrated with the mounts (i.e., diesets) 107, 110 are set partly around the cavity-forming blocks.

Figure 20:
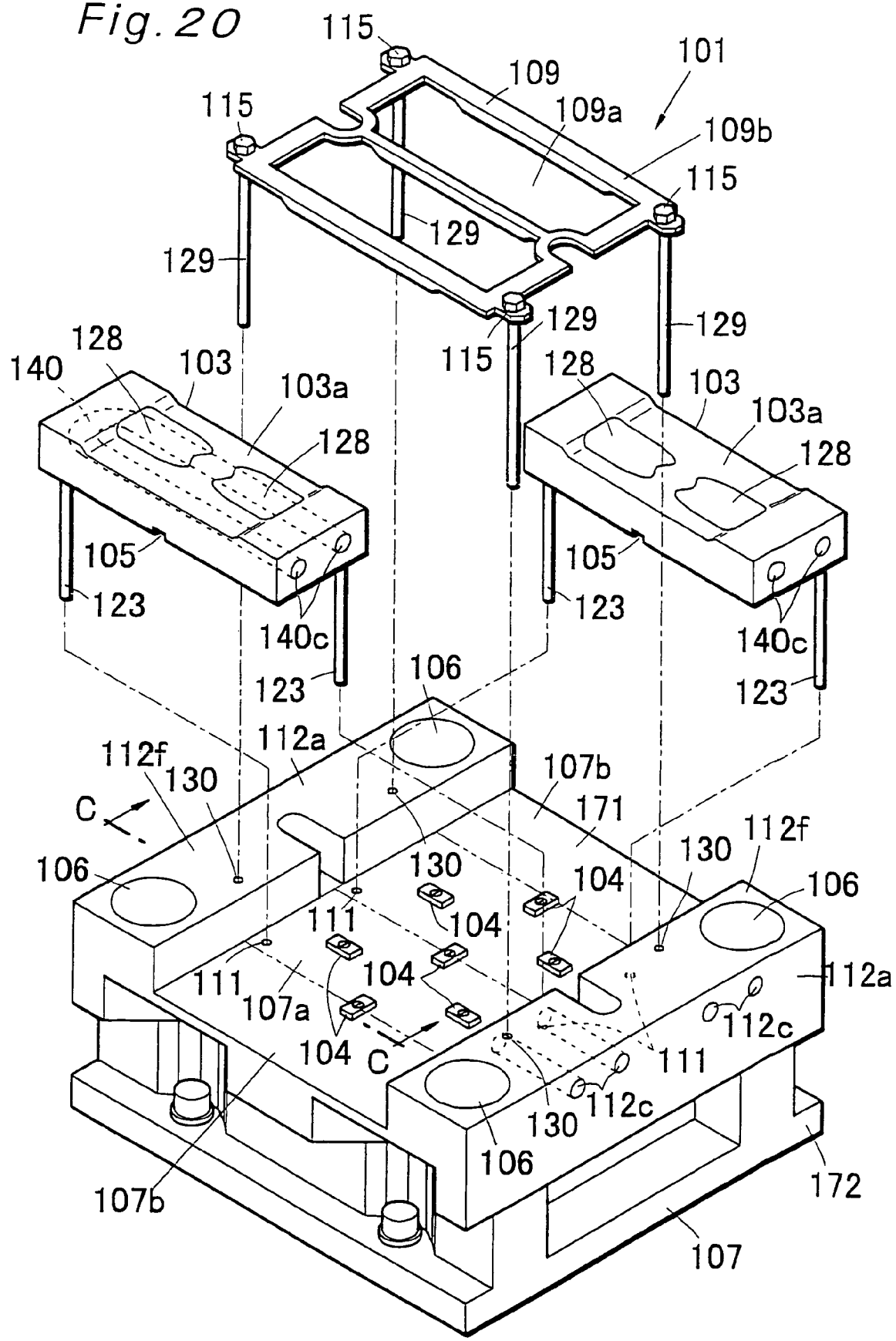
FIG. 20 is a perspective block diagram showing the movable-side mold in the mold for in-mold decoration of FIG. 19.

Description is first given of the movable-side mold. As shown in FIG. 19 and FIG. 20, in the movable-side mold 101, the cavity-forming block 103 is positioned and fixed on a mounting face 107a of the movable-side mount 107 by later-described protruding portions 104 and recess portions 105.

Clamping force-receiving portions 112a are integrally formed along one side of the face opposed to the stationary-side mold, the face being on the same plane as the mounting face 107a of the dieset 107. The clamping force-receiving portions 112a are provided so that their parting faces are positioned outside the mounting face 107a and outside a later-described passing region of the decorating film 13 (see FIG. 22). The parting faces are the faces which come into contact with the other mold when the clamping force-receiving portions 112a are in joined state, and in this embodiment, the parting faces are equivalent to opposed faces 112f of the clamping force-receiving portions 112a.

Moreover, a clamp 109 for retaining the decorating film is attached to the cavity-forming block 103.

In the dieset 107, as shown in FIG. 20, the face opposed to the stationary-side mold 102 is entirely smoothed, and a part of the opposed face functions as the mounting face 107a of the cavity-forming block 103. Since the mounting face 107a is present on the same plane as the face opposed to the stationary-side mold 102, smoothing of the mounting face can be achieved by smoothing the mounting face together with the remaining portion of the opposed face (smoothing face 107b), which allows smoothing to be conducted with ease and with high precision. On the mounting face 107a, as shown in FIG. 20, there are provided protruding portions 104 for determining the mounting position of the cavity-forming block 103 and for engaging both the mounting face 107a and the cavity-forming block 103, the detailed description of which will be given later.

Figure 21:
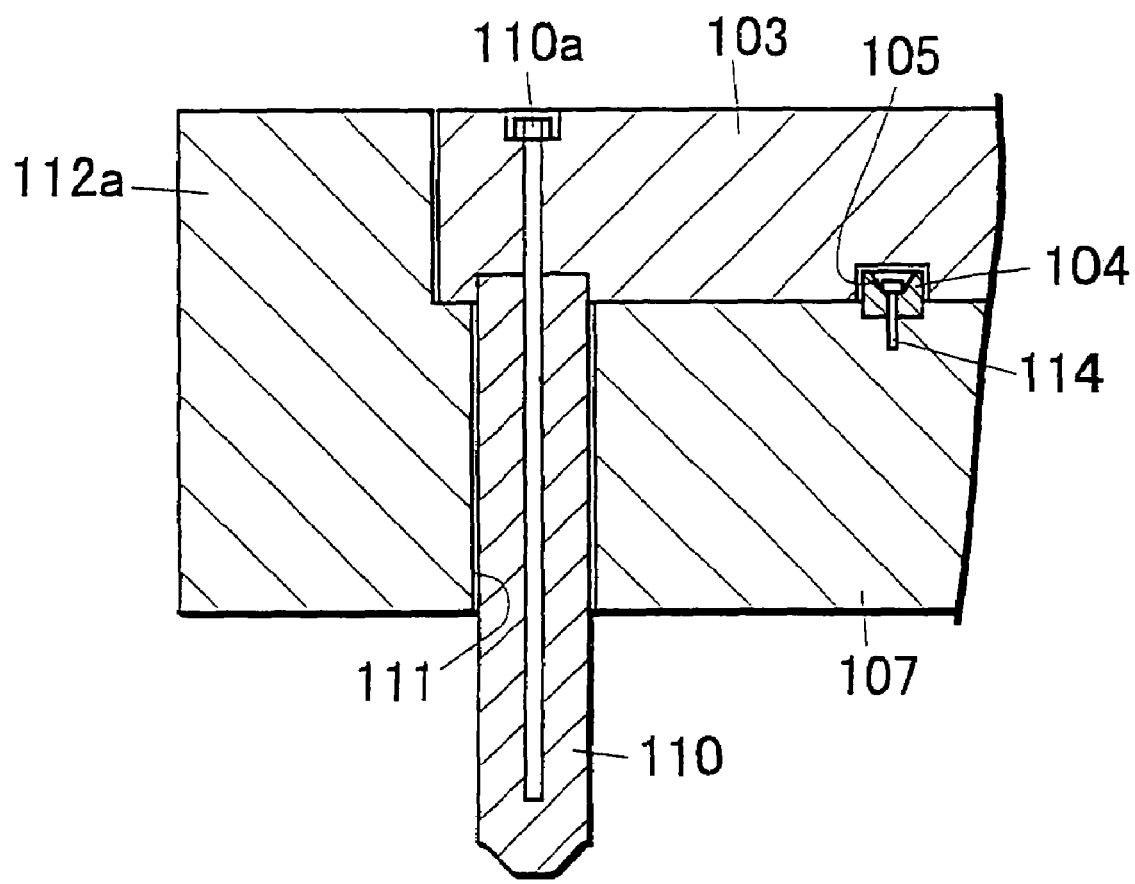
FIG. 21 is a cross sectional view taken along line C-C in FIG. 20.

As described later, in the cavity-forming block 103, the cavity 128 is provided on the cavity forming side face 103a, while the back face of cavity-forming block is structured to be smooth and is brought into contact with the mounting face 107a when the cavity-forming block 103 is mounted on the dieset 107. Mounting of the cavity-forming block 103 on the dieset 107 can be easily performed by using mounting members 123 provided on the back face of the cavity-forming block 103 as a guide. The mounting member 123 is, as shown in FIG. 21, a columnar rod-like member, which is fixed to the back face of the cavity-forming block by a screw 110a. The mounting member 123 goes through a through hole 111 provided on the dieset 107 and reaches the movable plate 201 of the in-mold decorating apparatus to be fixed thereon.

On one side face along the short side of the cavity-forming block 103, there are provided two coolant feed ports 140C which are connected to the feeder 203 to be cooled shown in FIG. 20, constituting one coolant flow line through a coolant feed line 140 provided therein. When mounting of the cavity-forming block 103 is conducted, the cavity-forming block 103 is connected to the feeder 203 via through holes 112c provided on the clamping force-receiving portion 112a. It is to be noted that in FIG. 20, the coolant feed line 140 is illustrated only on the cavity-forming block 103, and other illustration is omitted.

The clamp 109, which is as shown in FIG. 20, holds the decorating film 13 so as to press the decorating film 13 onto the cavity forming-side face 103a of the cavity-forming block 103, is composed of a film pressing portion 109b having a through portion 109a for inserting the cavity-forming block of the stationary-side mold into the plate-shaped member and four through portions 129 each hung vertically from the vicinity of corner portions of the film pressing portion 109b. The through portions 129 are inserted into clamp through holes 130 provided on the clamping force-receiving portions 112a on the dieset 107. The dieset 107 is equipped with a clamp moving mechanism (unshown) connected to the through portions 129 inserted into the clamp insertion holes 130 for moving the clamp 109 up and down, so that retention and release of the decorating film can be switched by up and down movement of the clamp 109. In the case of the molds according to the present embodiment, when the clamp 109 is moved up, the decorating film 13 is released from the clamp 109 and can be moved in the longitudinal direction, whereas when the clamp 109 is moved down, the decorating film 13 is pressed by the cavity forming-side face 103a so that the position is retained.

As shown in FIG. 20, the cavity-forming block 103 is a flat plate-shaped article having a small thickness in its center portion, with one flat face being the cavity forming-side face 103a on which the cavity 128 is formed, and the other flat face constituting a fixing face when the cavity-forming block 103 is mounted on the mounting face of the dieset.

The fixing face has recess portions 105 which engage with protruding portions 104 provided on the mounting face 107a of the dieset 107 for positioning the cavity-forming block on the mounting face 107a. The recess portions 105 are formed into a long hole which is long in radiating direction from a center portion of the cavity-forming block.

As shown in FIG. 20, the movable-side mold 101 has a connecting portion 172 for fixing the dieset 107 to the movable plate 201 of the in-mold decorating apparatus 200, a movable-side clamping plate 171 provided on the connecting portion 172, and rectangular parallelepiped protruding portions 104 for use in positioning the cavity-forming block. On the connecting portion 172, mechanisms for the cavity-forming block 103 and the clamp 109 are mounted, and at least part of the clamp moving mechanism for moving the clamp up and down as described above is provided.

As shown in FIG. 20, the clamping plate 171 is composed of: the clamping force-receiving portions 112a which are structured integrally and provided along opposed sides; the mounting face 107a which is interposed in between the clamping force-receiving portions 112a, which is the face opposed to the stationary-side mold, and which is for fixing the cavity-forming block; and the smoothing face 107b. The mounting face 107a of the cavity-forming block and the smoothing face 107b are smoothed as described above. On the opposed face, there are provided fixing through holes 111 for the cavity-forming block 103, and protruding portion fixing recess portions (unshown) for fixing the protruding portions 104. Since a pair of opposed sides are formed into a plate shape on the opposed face, smoothing the surface of the clamping plate 171 prior to provision of the protruding portions 104, various holes 111 and the protruding portion fixing recess portions allows polishing to be easily conducted and high precision to be secured.

The clamping force-receiving portion 112a is for receiving clamping force by an opposed face 112f which is on the side opposed to the stationary-side mold when the movable-side mold 101 and the stationary-side mold 102 are in joined state, and the opposed-side face 112f constitutes the parting face. The clamping force-receiving portion 112a has a guide bush 106, which is used for positioning the stationary-side mold 102 and the movable-side mold 101 when both the molds are joined. Moreover, the clamping force-receiving portion 112a has a notch provided in a middle portion for decreasing an area in contact with the cavity-forming block.

The protruding portions 104 are engaged with the recess portions 105 of the cavity-forming block 103 for positioning the cavity-forming block when the cavity-forming block is mounted on the mounting face 7a. As shown in FIG. 20, the protruding portion 104 is fixed by the screw 14 in the state that its lower portion is fitted into the protruding portion fixing recess portion of the clamping plate 171 (see FIG. 21). When the cavity-forming block 103 is mounted on the mounting face 107a, the protruding portion 104 is fitted into the recess portion 105 of the cavity-forming block, by which positioning of both the cavity-forming block and the mounting face are achieved. At this point, the setting place of both the block and the mounting face is adjusted so that a longitudinal external face of the protruding portion 144 and a longitudinal internal face of the recess portion are in contact with each other, and some clearance is provided between two short-side side faces so that displacement of the mounting position due to thermal expansion and shrinkage of the molds in the molding process can be diminished.

Figure 22:
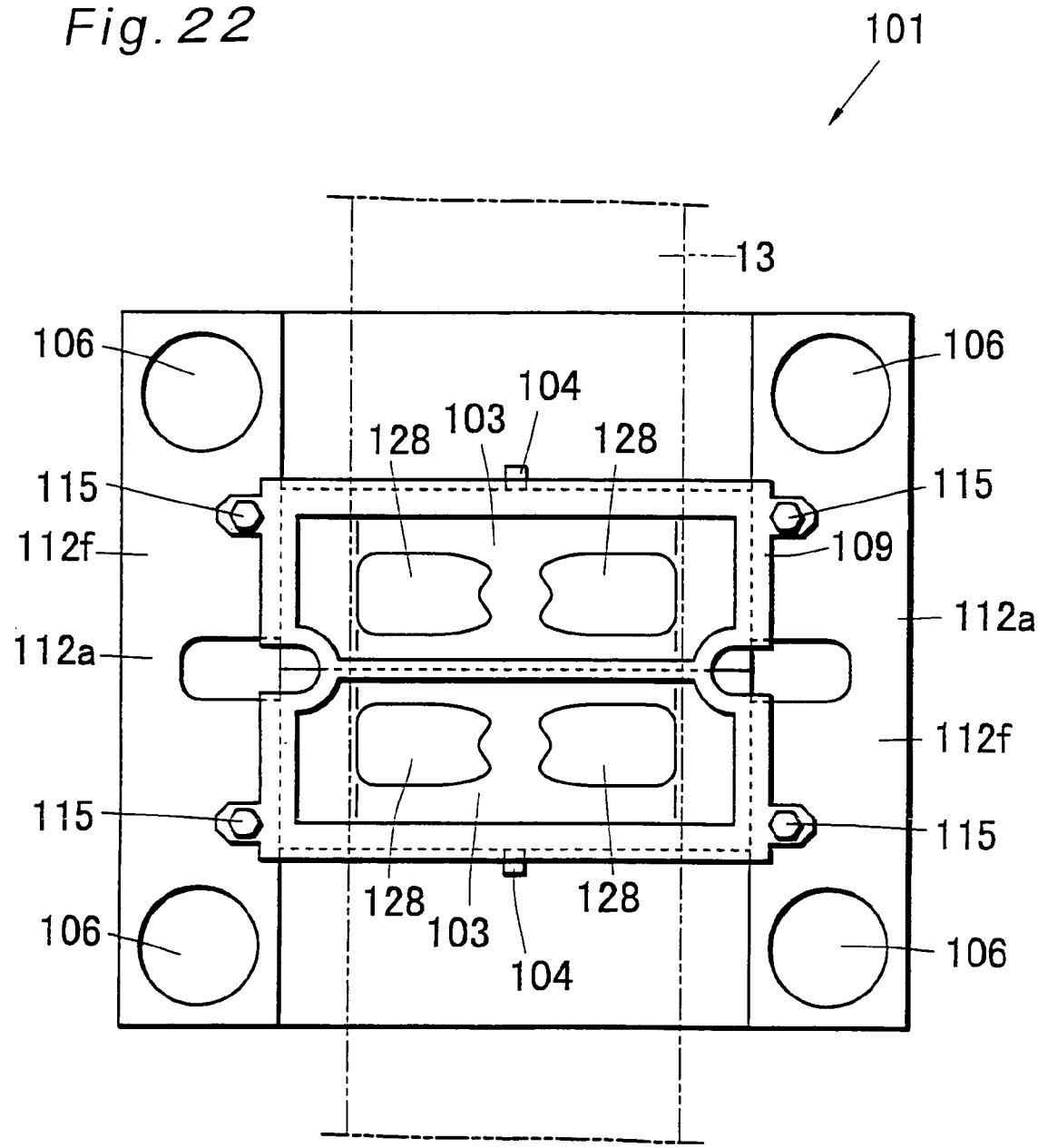
FIG. 22 is a view showing a positional relationship between the movable-side mold of FIG. 19 and a decorating film.

FIG. 22 is a plane view showing the movable-side mold of FIG. 19. As shown in FIG. 22, although a part of the side face of the cavity-forming block is in contact with the clamping force-receiving portions 112a, most parts of the side face are exposed. Since the side faces are exposed, the side faces of the cavity-forming block are in contact with air, which hinders heat conduction from the sides faces to the peripheries, thereby allowing thermal efficiency of the molds to be enhanced. As a result, the molding cycle can be shortened, and the mass-productivity is improved. Also, since temperature control of the molds becomes easier, there are less influences on the fluidization, solidification, shrinkage, crystallization, and the like of the molten resin material, so that decorated molded articles can be manufactured stably without the occurrence of deformations such as shrinkage, warpage, and torsion. Since the side faces are exposed to be in contact with air, smooth discharge during the air ventilating and gas ventilating can be achieved, allowing stable manufacturing of the decorated molded articles without gas burns or wrinkles on the decorated molded articles, or close contact failure between the decorating film 13 and the molded articles.

Moreover, since the region through which the decorating film 13 passes does not overlap with the clamping force-receiving portions 112a, the clamping force is not exerted on the decorating film when both the molds are closed.

Description is now given of the stationary-side mold 102. As shown in FIG. 23, in the stationary-side mold 102, the cavity-forming block 131 is positioned and fixed on a mounting face (unshown) of a stationary-side mount 110 by later-described protruding portions 144 and recess portions. Clamping force-receiving portions 112b are integrally formed along opposed sides of the face opposed to the stationary-side mold, the face being on the same plane as the mounting face of the dieset 110. The clamping force-receiving portions 112b are provided so that their parting faces are positioned outside the mounting face and outside the decorating film 13 positioned when the movable-side mold is closed. The parting faces are the faces which come into contact with the other mold when the clamping force-receiving portions 112b are in joined state, and in this embodiment, the parting faces are equivalent to opposed faces 112f of the clamping force-receiving portions 112b.

In the dieset 110, as shown in FIG. 23, the face opposed to the movable-side mold 101 is entirely smoothed, and a part of the opposed face functions as the mounting face of the cavity-forming block 131. Since the mounting face is present on the same plane as the face opposed to the movable-side mold 101, smoothing of the mounting face can be achieved by smoothing the entire opposed face together with the opposed face other than the mounting face (smoothing face 110b), which allows smoothing to be conducted with ease and with high precision. On the mounting face, there are provided protruding portions 144 for determining the mounting position of the cavity-forming block 131 and for engaging both the mounting face and the cavity-forming block. Since the provided protruding portions 144 share the same function as the protruding portions 104 of the movable-side mold, the description thereof is omitted.

As described later, in the cavity-forming block 131, the cavity 138 is provided on a cavity forming-side face 131a, while the back face of the cavity forming-side face 131a is structured to be smooth and is brought into contact with the mounting face when the cavity-forming block 131 is mounted on the dieset 110. Mounting of the cavity-forming block 131 on the dieset 110 is performed by using mounting members provided on the back face of the cavity-forming block 131 as with the movable-side mold 101.

As shown in FIG. 23, the cavity-forming block 131 is a flat plate-shaped article having a large thickness in its center portion, with one flat face being the cavity forming-side face 131a on which the cavity 138 is formed and the other flat face constituting a fixing face when the cavity-forming block is mounted on the mount face of dieset.

The fixing face has recess portions which engage with protruding portions 144 provided on the mounting face of the dieset 110 for positioning the cavity-forming block on the mounting face.

A broad thick portion of the cavity forming-side face 131a is formed into a shape which is fitted into the through portion 109a of the clamp 109 when both the molds are joined. Further, there is provided a sprue for sending molten resin injected from the injection nozzle 205 of the in-mold decorating apparatus 200 into the cavity 138.

The stationary-side mount 110 has a connecting portion 182 for fixing the dieset 110 to the stationary plate 202 of the in-mold decorating apparatus 200, a movable-side clamping plate 181 provided on the connecting portion 182, and rectangular parallelepiped protruding portions 144 for use in positioning the cavity-forming block 131. The connecting portion 182 has a connecting hole 10 (unshown) provided on its back face to be connected to the nozzle 205 for injecting molten resin.

As shown in FIG. 23, the clamping plate 181 is composed of: the clamping force-receiving portions 112b which are structured integrally and provided along opposed sides; the mounting face 107 (unshown) which is interposed in between the clamping force-receiving portions 112a, which is the face opposed to the stationary-side mold, and which is for fixing the cavity-forming block; and the smoothing face 110b. On the opposed face, there are provided fixing through holes for the cavity-forming block 131, and protruding portion fixing recess portions for fixing the protruding portions 144 (both unshown). Since a pair of opposed sides are formed into a plate shape on the opposed face, smoothing the surface of the clamping plate 181 prior to provision of the protruding portions 144, various holes and the protruding portion fixing recess portions allows polishing to be easily conducted and high precision to be secured.

The clamping force-receiving portion 112b is for receiving clamping force by an opposed face 112f which is on the side opposed to the stationary-side mold when the movable-side mold 101 and the stationary-side mold 102 are in joined state, and the opposed-side face 112f constitutes the parting face. Moreover, notches 122 are provided on the opposed face 112f for the clamp so as to prevent interference of the clamp 109 of the movable-side mold 101 when the both molds are joined. The clamping force-receiving portion 112b has a guide pin 113, which is fitted into the guide bush 106 of the clamping force-receiving portion 112b of the movable-side mold 101 when the stationary-side mold 102 is joined with the movable-side mold 101 so as to be used for positioning both the molds. The protruding portions 144 are engaged with the recess portions (unshown) of the cavity-forming block 131 for positioning the cavity-forming block when the cavity-forming block is mounted on the mounting face. Adjustment of the setting places and the means for fixing the protruding portions can be set as in the same manner as with the case of the movable-side mold.

In both the molds 101, 102, the clamping force-receiving portions 112a, 112b receive clamping force in joined state, and contact faces 112f function as parting faces. In the state where both the molds are closed, in the present embodiment, the broad thick portion of the cavity forming-side face 131a on the cavity-forming block of the stationary-side mold is fitted into the through portion 109a of the clamp 109, and a slim clearance is formed between the cavity forming-side faces 121a and 131a of two cavity-forming blocks 121 and 131. The dimension of the clearance 75 may be any dimension which can prevent clamping force of both the molds 101, 102 from being exerted on the decorating film 13, and therefore the dimension may be, for example, almost identical to the thickness of the decorating film 13.

Although in the present embodiment, the cavity-forming block is mounted on the mounting portion through engagement of the protruding portion and the recess portion without provision of the pockets on both the stationary-side mold and the movable-side mold, it is possible, for example, to use a mold with a pocket as one of the molds.

In addition to the aforementioned effect, since the molds according to the present embodiment do not have a pocket into which the cavity-forming blocks 121, 131 are fitted, it is unnecessary to do clearance adjustment for air ventilating or gas ventilating with respect to the portions of the movable-side mount 107 and the stationary-side mount 110 surrounding the cavity-forming blocks 121, 131. As a result, it becomes possible to meet shorter delivery periods and reduce the manufacturing cost, compared with the prior art.

It is noted here that molded articles to which an in-mold decoration method is applicable with use of the molds according to the present embodiment should preferably be applied to those having relatively low product side walls in terms of the characteristics including the steps of continuously feeding the printed or otherwise worked decorating film into a mold, doing injection molding with the decorating film laid along the cavity configurations of the cavity-forming blocks 121, 131, and integrating the printed layer or the like with the molded article surface by resin pressure and heat in the molding process. In the molds according to the present invention, three side faces of the cavity-forming block are in contact with other members, which makes it possible to set the height of the product side walls at as high as about 15 mm.

It should be understood that the present invention is not limited to the embodiments disclosed and can be embodied in various forms. Although positioning is achieved when both the molds are joined by providing the guide bush on the movable-side mold and the guide pin on the stationary-side mold, it is also possible to reverse the combination, that is, the guide pin being provided on the movable-side mold and the guide bush being provided on the stationary-side mold.

Further, after the mounting faces 7a, 10a and 107a are smoothed, there may be provided on the smoothing faces 7b, 10b, 107b and 110b, other members having opposed faces which are lower than the opposed faces 6f and 112f of the clamping force-receiving portions when viewed from the mounting faces of the cavity-forming blocks in the state that both the molds are joined. Other members are exemplified by, for example, a block which comes into contact with at least a part of the side faces of a cavity-forming block, and the block may be structured integrally with the clamping force-receiving portions (6a, 6b).

It is to be understood that among the aforementioned various embodiments, arbitrary embodiments may be properly combined so as to achieve the effects possessed by each embodiment.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. A mold for in-mold decoration, comprising a stationary-side mold member and a movable-side mold member for receiving a roll-type decorating film, wherein a first one of said mold members comprises:
    a cavity-forming block having a cavity configured to receive a molten resin and a design pattern of the decorating film to mold a molded article; and
    a dieset for mounting said cavity-forming block, said dieset comprising:
        a smooth mounting face which faces a second one of said mold members and overlaps with a passing region through which the decorating film is to be passed; and
        a clamping-force receiving portion shaped and arranged to allow the roll-type decorating film to pass entirely and continuously through the passing region between said mold members when said mold members are in a joined position, said clamping-force receiving portion arranged around said mounting face substantially symmetrical with respect to a center line of said first one of said mold members along a passing direction of the decorating film, so as to be outside of the passing region of the decorating film;
    wherein one of said dieset and said cavity-forming block includes an engagement recess portion, and the other one of said dieset and said cavity-forming block includes an engagement protruding portion, said engagement protruding portion and said engagement recess portion being shaped and arranged to engage each other so as to position said cavity-forming block at said mounting face of said dieset and mount said cavity-forming block on said dieset.

2. The mold for in-mold decoration as recited in claim 1, wherein
    one of said engagement protruding portion and said engagement recess portion is provided on said mounting face of said dieset, and the other one of said engagement protruding portion and said engagement recess portion is provided on a back face of said cavity-forming block; and
    said engagement recess portion comprises an elongated hole having a longitudinal axis extending in a radial direction from either an injection port on said dieset for injecting the molten resin into said cavity, or from a sprue of said cavity-forming block for feeding the molten resin from said injection port to said cavity, said engagement recess portion having a longitudinal inner wall shaped and arranged to contact said engagement protruding portion when said cavity-forming block is mounted on said dieset.

3. The mold for in-mold decoration as recited in claim 2, wherein said engagement protruding portion is located on said mounting face of said dieset, and said engagement recess portion is located on said back face of said cavity-forming block.

4. The mold for in-mold decoration as recited in claim 1, wherein said mold members form a clearance for interposing the decorating film in the joined position, the clearance being inside the passing region of the decorating film.

5. The mold for in-mold decoration as recited in claim 4, wherein said clamping-force receiving portion extends beyond said cavity-forming block in a direction perpendicular to said mounting face of said dieset so as to form the clearance.

6. The mold for in-mold decoration as recited in claim 4, wherein the clearance is shaped such that said mold members do not exert a clamping force on the decorating film in the joined position.

7. The mold for in-mold decoration as recited in claim 4, wherein the clearance has a depth substantially identical to a thickness of the decorating film.

8. The mold for in-mold decoration as recited in claim 1, wherein said dieset further comprises a smooth face disposed on the same plane as said mounting face.

9. The mold for in-mold decoration as recited in claim 1, wherein said clamping-force receiving portion is formed integrally with said dieset.

10. The mold for in-mold decoration as recited in claim 1, further comprising a clamp for retaining the design pattern of the decorating film inside said cavity, said clamp being supported by said cavity-forming block.

11. The mold for in-mold decoration as recited in claim 1, further comprising a clamp for retaining the design pattern of the decorating film inside said cavity, said clamp being supported by said clamping-force receiving portion.

12. The mold for in-mold decoration as recited in claim 1, wherein said cavity-forming block further comprises a coolant pipeline for supplying a coolant to cool the molten resin, said coolant pipeline being directly connected to a coolant feeder.

13. The mold for in-mold decoration as recited in claim 1, wherein said clamping-force receiving portion and said cavity-forming block are spaced apart.

14. The mold for in-mold decoration as recited in claim 5, wherein the clearance is shaped such that said mold members do not exert a clamping force on the decorating film when said mold members are in the joined position.

15. The mold for in-mold decoration as recited in claim 5, wherein the clearance has a depth substantially identical to a thickness of the decorating film.

16. The mold for in-mold decoration as recited in claim 1, where said clamping-force receiving portion comprises a plurality of components evenly arranged around said cavity-forming block.

17. The mold for in-mold decoration as recited in claim 16, wherein said clamping-force receiving portion comprises two components.

18. The mold for in-mold decoration as recited in claim 16, wherein said clamping-force receiving portion comprises four components.

19. The mold for in-mold decoration as recited in claim 1, wherein said second one of said mold members comprises:
  a cavity-forming block having a cavity configured to receive the molten resin and the design pattern of the decorating film to mold the molded article; and
  a dieset for mounting said cavity-forming block, said dieset comprising:
    a smooth mounting face which faces the first one of said mold members and overlaps with the passing region of the decorating film; and
    a clamping-force receiving portion shaped and arranged to allow the roll-type decorating film to pass entirely and continuously through the passing region between said mold members when said mold members are in the joined position, said clamping-force receiving portion arranged around said mounting face substantially symmetrical with respect to a center line of said second one of said mold members along the passing direction of the decorating film, so as to be outside of the passing region of the decorating film;
  wherein one of said dieset and said cavity-forming block includes an engagement recess portion, and the other one of said dieset and said cavity-forming block includes an engagement protruding portion, said engagement protruding portion and said engagement recess portion being shaped and arranged to engage each other so as to position said cavity-forming block at said mounting face of said dieset and mount said cavity-forming block on said dieset.

* * * * *